United States Patent [19]
Hayashi et al.

[11] Patent Number: 5,543,069
[45] Date of Patent: Aug. 6, 1996

[54] MAGNETIC PARTICLES FOR MAGNETIC RECORDING MEDIUM AND PROCESS FOR PRODUCING THE SAME

[75] Inventors: Kazuyuki Hayashi; Minoru Ohsugi; Hiroko Morii; Norio Sugita, all of Hiroshima, Japan

[73] Assignee: Toda Kogyo Corporation, Japan

[21] Appl. No.: 509,607

[22] Filed: Jul. 31, 1995

Related U.S. Application Data

[62] Division of Ser. No. 149,834, Nov. 10, 1993, Pat. No. 5,484,545.

[30] Foreign Application Priority Data

Nov. 11, 1992 [JP] Japan ................... 4-327322

[51] Int. Cl.$^6$ .................................. C04B 35/26
[52] U.S. Cl. .................. 252/62.58; 252/62.59; 428/404; 428/65.3; 428/65.6
[58] Field of Search ............ 252/62.58, 62.59; 428/404, 65.3, 65.6

[56] References Cited

U.S. PATENT DOCUMENTS

| | | | |
|---|---|---|---|
| 4,956,220 | 9/1990 | Sueyoshi et al. | 428/141 |
| 5,102,732 | 4/1992 | Goto et al. | 428/329 |
| 5,124,207 | 6/1992 | Hayashi et al. | 428/404 |
| 5,356,712 | 10/1994 | Hashiuchi et al. | 252/62.59 |

FOREIGN PATENT DOCUMENTS

| | | |
|---|---|---|
| 0238069 | 9/1987 | European Pat. Off. . |
| 0394034 | 10/1990 | European Pat. Off. . |
| 3922912A1 | 1/1990 | Germany . |
| 55-83207 | 6/1980 | Japan . |
| 55-157216 | 12/1980 | Japan . |
| 57-56904 | 4/1982 | Japan . |
| 6250889 | 2/1983 | Japan . |
| 58-60506 | 4/1983 | Japan . |
| 58-161725 | 9/1983 | Japan . |
| 59-23505 | 2/1984 | Japan . |
| 59-103310 | 6/1984 | Japan . |
| 60-217529 | 10/1985 | Japan . |
| 61-63921 | 4/1986 | Japan . |
| 62-89226 | 4/1987 | Japan . |
| 63-64306 | 3/1988 | Japan ................ 252/62.59 |
| 63-161522 | 7/1988 | Japan . |
| 63-303817 | 12/1988 | Japan . |
| 2-70003 | 3/1990 | Japan . |
| 2-188429 | 7/1990 | Japan . |
| 2-280301 | 11/1990 | Japan . |

OTHER PUBLICATIONS

Patent Abstracts of Japan, vol. 7, No. 148 (E–184) 29 Jun. 1983 & JP–A–58 060 506 (Ishihara Sangyo KK) 11 Apr. 1983. Abstract.

*Primary Examiner*—Melissa Bonner
*Attorney, Agent, or Firm*—Nixon & Vanderhye

[57] ABSTRACT

Disclosed herein magnetic particles for magnetic recording which comprise acicular or plate-like magnetic particles and not less than 0.01 wt % (calculated as Al, $SiO_2$ or Al and $SiO_2$ and based on the acicular or plate-like magnetic particles) of an oxide or hydroxide containing Al, Si or both Al and Si and adhered to the surfaces of the acicular or plate-like magnetic particles, and which have not less than 0.50 of a molecular-weight-dependent parameter α represented by the following formula (I):

$$As = K_1 \cdot M^\alpha \qquad (I)$$

wherein M represents a number-average molecular weight of a binder, As represents a saturation adsorption of said binder, and $K_1$ represents a constant dependent on the binder and a solvent used for measuring As.

13 Claims, No Drawings

MAGNETIC PARTICLES FOR MAGNETIC RECORDING MEDIUM AND PROCESS FOR PRODUCING THE SAME

This is a division of application Ser. No. 08/149,834, filed Nov. 10, 1993 now U.S. Pat. No. 5,484,545.

BACKGROUND OF THE INVENTION

The present invention relates to magnetic particles for a magnetic recording medium which are excellent in dispersibility and are suitable as magnetic particles for high-density recording, a process for producing the magnetic particles and a magnetic recording medium therefrom.

With the recent development of miniaturized and lighter-weight magnetic recording and reproducing apparatuses, recording media such as a magnetic tape, a magnetic disk, a magnetic card and the like have increasingly been required to have a higher performance and a higher recording density.

In order to improve the performance and the recording density of a magnetic recording medium, it is necessary to improve the residual magnetic flux density Br of the magnetic recording medium. The residual magnetic flux density Br of the magnetic recording medium largely depends upon the dispersibility of the magnetic particles in the vehicle and the orientation property and the packing property of the magnetic particles in the coating film.

Various attempts have been made to improve the dispersibility of magnetic particles. For example, there is a method of modifying the surfaces of the magnetic particles by coating with an Si compound or an Al compound, as described in Japanese Patent Application Laid-Open (KOKAI) Nos. 55-83207 (1980), 57-56904 (1982), 58-60506 (1983), 58-161725 (1983), 59-23505 (1984), 60-217529 (1985), 61-63921 (1986) and 62-89226 (1987).

For example, Japanese Patent Application Laid-Open (KOKAI) No. 58-161725 (1983) discloses a method of producing magnetic iron powder comprising neutralizing an alkaline suspension containing iron powder, silicate and aluminate with an acid such as carbon dioxide gas so as to form a film of silicic acid and aluminum oxide on the particle surfaces of the iron powder.

Japanese Patent Application Laid-Open (KOKAI) No. 57-56904 (1982) discloses a magnetic powder for magnetic recording, comprising fine hexagonal ferrite particles having an average particle diameter of 0.01 to 0.3 μm which are obtained by depositing $SiO_2$ to the particle surfaces.

Japanese Patent Application Laid-Open (KOKAI) No. 62-89226 (1987) discloses a magnetic powder produced by forming a layer of an aluminum compound on the surface of magnetic iron oxide powder containing cobalt having a BET specific surface area of not less than 40 $m^2/g$, and a process for producing a magnetic powder comprising reacting the magnetic iron oxide powder in an aqueous solution containing a cobalt salt, a ferrous salt and an alkali, thereby forming an iron oxide layer containing cobalt on the particle surfaces of a magnetic iron oxide powder, and adding an aqueous solution of an aluminum salt in the reaction solution so as to neutralize the reaction solution, thereby forming a layer of an aluminum compound on the iron oxide layer containing cobalt.

A method of producing a magnetic particles by coating the surfaces of magnetic particles with a film of an Si compound, forming a film of an Al compound thereon, and further forming a film of an Si compound on the film of the Al compound is also known, as described in, for example, Japanese Patent Application Laid-Open (KOKAI) No. 63-161522 (1988).

Methods of coating the surfaces of magnetic particles with a compound other than an Si compound and an Al compound are disclosed in, for example, Japanese Patent Application Laid-Open (KOKAI) Nos. 62-50889 (1987) disclosing a method of coating the particle surfaces with Mg, Ca, St, Ba, Zn, Cd, Al, Ga, Y, Pb or the like; 59-103310 (1984) disclosing a method of coating the particle surfaces with Cu, Al, Ti, Zr, Sn, V, Nb, Sb, Cr, Mo, W, Ni or the like; 63-303817 (1986) disclosing a method of coating the particle surfaces with Si, Al, Ca, Ti, V, Mn, Ni, Zn, P or the like; and 2-70003 (1990) disclosing a method of coating the particle surfaces with P and Zn, Co, Ni, Cr, Cu, Fe, Al or the like.

Japanese Patent Application Laid-Open (KOKAI) No. 59-103310 (1984) discloses a method of producing magnetic iron oxide containing cobalt by coating at least one selected from the group consisting of the oxide or hydroxides of Cu, Al, Ti, Zr, Sn, V, Nb, Sb, Cr, Mo, W, and Ni to the particle surfaces of magnetic iron oxide containing cobalt and then treating the iron oxide containing cobalt with steam, or treating the iron oxide containing cobalt with steam before coating step of the oxide or hydroxide to the particle surfaces.

Japanese Patent Application Laid-Open (KOKAI) No. 2-70003 (1990) discloses a method of treating a ferromagnetic iron powder by oxidizing in an atmosphere containing oxygen the surface of the ferromagnetic iron powder containing iron as the main ingredient and produced by a dry-reduction process, suspending the ferromagnetic iron powder in water, and adding a phosphoric acid compound and a metal salt of at least one selected from the group consisting of Zn, Co, Ni, Cr, Cu, Fe, and Al to the thus-obtained suspension so as to deposit phosphoric acid and a compound of the metal to the ferromagnetic iron powder.

Furthermore, Japanese Patent Application Laid-Open (KOKAI) No. 58-60506 (1983) discloses a magnetic powder having improved dispersibility which contains at least one selected from the group consisting of the oxide or hydroxides of Cu, Ag, Al, Ti, Zr, Sn, V, Nb, Ta, Sb, Cr, Mo, W and Ni on the surface thereof.

Although magnetic particles having an excellent dispersibility are now in the strongest demand, the particles obtained by any of the above-described known methods cannot be said to have an excellent dispersibility.

The reason why particles having an excellent dispersibility are not obtained by any known method is that magnetic particles agglomerate due to the interaction caused by the magnetism, as described at p. 16 of *Magnetic Paint Seen from a Standpoint of a Researcher of Magnetic Recording Material* pp. 14 to 16 of PROCEEDING OF SEVENTH SUMMER FERRITE SEMINER (1977), published by the Society of Powder and Powder Metallurgy, " . . . It is generally considerably difficult to obtain a high degree of dispersion even in an ordinary non-magnetic pigment. It is much more difficult in the case of a magnetic powder due to a magnetic interaction . . . ", and the surface of each agglomerate is coated.

Especially, in the case of hexagonal ferrite particles which have an easy magnetization axis perpendicular to the plane, the particles so firmly agglomerate due to the interaction caused by the magnetism that it is difficult to separate the agglomerates into discrete particles merely by a mechanical treatment.

The dispersibility of magnetic particles means to what degree the magnetic particles disperse in a polymer, as described at p. 505 of *Explication and Applied technique of Dispersion and Agglomeration* (1992), published by K. K. Technosystem, " . . . A magnetic coating is prepared by stably dispersing a magnetic powder in a system containing, as the main ingredient, a high-molecular resin-solvent as a binding dispersant. A substrate is uniformly coated with the magnetic coating. The performance of the thus-obtained recording medium is therefore largely dependent upon the dispersion stability of the magnetic particles . . . " For this reason, many studies have been undertaken as to the improvement of the dispersibility of magnetic particles.

The evaluation of the dispersibility is represented by a molecular-weight-dependent parameter α (hereinunder referred to merely "parameter α"), as described at pp. 94 to 96 of the above-described *Explication and Applied technique of Dispersion and Agglomeration*, " . . . Many natural and synthetic polymers are adsorbed onto the surface of colloidal particles and form a thick adsorption layer, which exerts a great influence on the stability of the dispersion system. The following relationship generally holds between the molecular weight (M) and the saturation adsorption (As) of a polymer:

$$As = K_1 \cdot M^\alpha \quad (I)$$

wherein $K_1$ is a constant characteristic of the system, and α is called a molecular-weight-dependent parameter, which is also characteristic of the system and changes between 0 and 1 depending upon the structure of the adsorption layer . . . When α=1, the polymer is adsorbed at the end of a molecule. The saturation adsorption (As) is proportional to the molecular weight (M). In this system, since the molecular of the polymer stands close together in the form of the deepest adsorption layers on the particle surfaces, a strong solid repulsion effect is produced and effectively contributes to the stability of the dispersion system . . . "

The parameter α of the magnetic particles obtained by coating the particle surfaces with an Si compound or an Al compound in accordance with the known methods described in Japanese Patent Application Laid-Open (KOKAI) Nos. 55-83207 (1980), 57-56904 (1982), 58-60506 (1983), 58-161725 (1982), 59-23505 (1984), 60-217529 (1985), 61-63921 (1986) and 62-89226 (1987), was about 0.40 to 0.45, while the parameters α of the particles which were not subjected to such a surface-treatment was about 0.28 to 0.34.

The parameters α of the magnetic particles obtained by the methods described in Japanese Patent Application Laid-Open (KOKAI) Nos. 63-161522 (1988), 58-60506 (1983), 59-103310 (1984), 63-303817 (1988) and 2-280301 (1990) was about 0.40 to 0.45.

On the other hand, when a magnetic tape is produced from such magnetic particles, the following problems are sometimes caused.

Firstly, the strength of the coating film is sometimes lowered. This fact is described, for example, at p. 170 of *Causes for Friction and Abrasion between Magnetic Tape and Magnetic Head and Countermeasure for Troubles* (1987), published by the publication department of Technological Information Center, " . . . The binder of a magnetic recording layer is softened so much as to be adhered to the adjacent layer, or the coating film is so aged that the strength is lowered, which is likely to lead to the peel-off of the coating film or dropouts . . . "

The activity of the surfaces of magnetic particles is generally high, so that in a magnetic coating produced from the magnetic particles and a binder resin, the condensation or association of the molecules of the solvent which come into contact with the surfaces of the magnetic particles is caused, thereby raising the boiling point of the solvent in the magnetic coating and making the vaporization of solvent in the magnetic coating difficult. The lowering of the strength of the coating film is caused by a large amount of residual solvent in the magnetic film.

Even after the magnetic coating is oriented and dried during the production of a magnetic tape, the solvent which cannot evaporate remains in the magnetic coating film, so that the magnetic layer is plasticized and softened, which influences the physical properties of the coating film.

The amount of residual solvent on the surface of magnetic particles was not less than 2.0% (calculated as C), when the surfaces of the magnetic particles were not coated with any of the above-described compounds in accordance with the known methods.

Secondly, in a magnetic tape produced from magnetic particles, the mechanical strength is sometimes lowered or the increase of the friction coefficient sometimes causes a trouble. This fact is described, for example, at p. 169 of *Causes for Friction and Abrasion between Magnetic Tape Magnetic Head and Countermeasure for Troubles* (1987), published by the publication department of Technologic Information Center, " . . . The higher the surface strength (the scratch resistance) of the magnetic layer, the smaller the increase of dropouts with respect to the frequency of use . . . ", and " . . . In a magnetic recording system, the magnetic tape runs in contact with the head and the fixed guides. The friction coefficient of the magnetic tape and the contacting portion of the recording machine directly influences the running property of the magnetic tape . . . "

In order to improve the durability and running property of a magnetic tape, abrasives and lubricants are generally added during the production of the magnetic tape.

Although the appropriate addition of abrasives and lubricants improves the durability and running property of a magnetic tape, if the amount is too much, such an additive sometimes deteriorates the signal recording property (electromagnetic conversion property) of the magnetic tape or even lowers the durability. The amount of abrasives and lubricants used therefore has its limitation.

The present inventors have made an attempt to improve the durability of a magnetic tape while reducing the amount of used abrasives and lubricants by modifying the surfaces of the magnetic particles.

Thirdly, when the surface resistance of the magnetic tape produced from magnetic materials and a binder resin sometimes increases, thereby causing a trouble. This fact is described, for example, at p. 171 of *Causes for Friction and Abrasion between Magnetic Tape and Magnetic Head and Countermeasure for Troubles* (1987), published by the publication department of Technologic Information Center, " . . . When a magnetic tape slides in a recording machine and causes charging, the load drawn from half of the tape is increased, the tape absorbs dust, thereby causing dropouts. Also the tape adheres to the drum in a helical scan system, or the discharge noise (white noise) is caused by discharging. In order to prevent charging, an antistatic agent is added or a material which lowers the surface resistance is selected . . . "

For example, in order to prevent a magnetic tape from charging and to lower the surface resistance, carbon black or the like is generally added during the production of the magnetic tape.

Although the addition of an appropriate amount of carbon black or another antistatic agent is effective in preventing charging and the lowering of the surface resistance, too much addition thereof sometimes deteriorates the magnetic properties of the magnetic tape such as the saturation magnetization and the residual magnetization. The amount of antistatic agent added therefore has its limitation.

The present inventors have also made an attempt to reduce the surface resistance of a magnetic tape while reducing the amount of used carbon black or another antistatic agent by modifying the surfaces of the magnetic particles.

Accordingly, the technical problems to be solved of the present invention are to provide magnetic particles, (A) which have excellent dispersibility and large parameter α, or (B) which have excellent dispersibility and large parameter α and (i) which can improve the strength of the coating film of a magnetic recording medium produced therefrom, (ii) which can provide a magnetic recording medium produced therefrom with a high durability by improving the mechanical strength and reducing the friction coefficient, or (iii) which can lower the surface resistance of a magnetic recording medium produced therefrom without impairing the saturation magnetization and the residual magnetization.

As a result of studies undertaken by the present inventors so as to solve the technical problems, it has been found that by adding an aqueous alkali solution to an aqueous suspension containing magnetic particles as a raw material to obtain a suspension having a pH of not less than 10, adding an aqueous solution containing Al, an aqueous solution containing Si or a mixture thereof to the resultant suspension, adjusting the pH of the suspension to approximately the neutrality under stirring, thereby quickly precipitating an oxide or hydroxide containing Al, Si or both Al and Si in not more than 10 minutes, filtering out the magnetic particles together with the oxide or hydroxide deposited or precipitated on the surface or periphery of the magnetic particles in the suspension to obtain a solid substance composed of the magnetic particles and the oxide or hydroxide deposited or precipitated on the surface or periphery of the magnetic particles, washing and drying the solid substance, and compacting and pulverizing the obtained solid substance by an edge runner mill, the thus-obtained magnetic particles have a molecular-weight-dependent parameter α of not less than 0.50 and show an excellent dispersibility. On the basis of this finding, the present invention has been achieved.

SUMMARY OF THE INVENTION

It is an object of the present invention to provide magnetic particles which are excellent in dispersibility and which have a molecular-weight-dependent parameter α of not less than 0.50.

It is another object of the present invention to provide magnetic particles which are excellent in dispersibility and have a molecular-weight-dependent parameter α of not less than 0.50, and in which a strength of the coating film of a magnetic recording medium (tape) produced therefrom is improved.

It is still another object of the present invention to provide magnetic particles which are excellent in dispersibility and have a molecular-weight-dependent parameter α of not less than 0.50, and in which a magnetic recording medium produced therefrom shows a high durability by improving the mechanical strength and reducing the friction coefficient.

It is a further object of the present invention to provide magnetic particles which are excellent in dispersibility and have a molecular-weight-dependent parameter α of not less than 0.50, and in which a surface resistance of a magnetic recording medium produced therefrom is small.

To achieve this aim, in first aspect of the present invention, there are provided magnetic particles for magnetic recording which comprise acicular or plate-like magnetic particles and not less than 0.01 wt % (calculated as Al, $SiO_2$ or Al and $SiO_2$ based on the acicular or plate-like magnetic particles) of an oxide or hydroxide containing Al, Si or both Al and Si and adhered to the surfaces of the acicular or plate-like magnetic particles, and which have not less than 0.5 of a molecular-weight-dependent parameter α represented by the following formula (I):

$$As = K_1 \cdot M^\alpha \qquad (I)$$

wherein M represents a number-average molecular weight of a binder, As represents a saturation adsorption amount of the binder, and $K_1$ represents a constant dependent on the binder and a solvent used for measuring As.

In a second aspect of the present invention, there are provided magnetic particles for magnetic recording which comprise acicular or plate-like magnetic particles, and not less than 0.01 wt % (calculated as Al, $SiO_2$ or Al and $SiO_2$ based on the acicular or plate-like magnetic particles) of an oxide or hydroxide containing Al, Si or both Al and Si, and not less than 0.01 wt % (calculated as Zn, Ni, Mg, Ca, Sr, Ba, P, Zr, Ti, Hf, Mo, Sn, Sb, Pd and/or Fe based on the acicular or plate-like magnetic particles) of an oxide or hydroxide containing at least one selected from the group consisting of Zn, Ni, Mg, Ca, Sr, Ba, P, Zr, Ti, Hf, Mo, Sn, Sb, Pd and Fe, which are adhered to the surfaces of the acicular or plate-like magnetic particles; and which have not less than 0.5 of a molecular-weight-dependent parameter α represented by the following formula (I):

$$As = K_1 \cdot M^\alpha \qquad (I)$$

wherein M represents a number-average molecular weight of a binder, As represents a saturation adsorption amount of the binder, and $K_1$ represents a constant dependent on the binder and a solvent used for measuring As.

In a third aspect of the present invention, there are provided a magnetic medium comprising a substrate and a magnetic coating containing magnetic particles defined in the first aspect, which is applied to said substrate.

In a fourth aspect of the present invention, there are provided a magnetic medium comprising a substrate and a magnetic coating containing magnetic particles defined in the second aspect, which is applied to said substrate.

In a fifth aspect of the present invention, there are provided a process for producing magnetic particles for magnetic recording comprising the steps of:

adding an aqueous alkali solution to an aqueous suspension containing acicular or plate-like magnetic particles to obtain a suspension having a pH of not less than 10;

adding an aqueous solution containing Al, an aqueous solution containing Si or a mixture thereof to said suspension;

adjusting the pH of said suspension to approximately the neutrality under stirring to quickly precipitate an oxide or hydroxide containing Al, Si or both Al and Si;

filtering out said acicular or plate-like magnetic particles together with said oxide or hydroxide deposited or precipitated on the surface or periphery of the acicular or plate-like magnetic particles in said suspension;

washing and drying the obtained solid substance composed of the acicular or plate-like magnetic particles and said oxide or hydroxide; and compacting and pulverizing said solid substance by an edge runner mill so as to adhere an oxide or hydroxide containing Al, Si or both Al and Si to the surfaces of said acicular or plate-like magnetic particles.

In a sixth aspect of the present invention, there are provided a process for producing magnetic particles for magnetic recording comprising the steps of:

adding an aqueous alkali solution to an aqueous suspension containing acicular or plate-like magnetic particles to obtain a suspension having a pH of not less than 10;

adding an aqueous solution containing Al, Si, or Al and Si, and further containing at least one selected from the group consisting of Zn, Ni, Mg, Ca, Sr, Ba, P, Zr, Ti, Hf, Mo, Sn, Sb, Pd and Fe to said suspension;

adjusting the pH of said suspension to approximately the neutrality under stirring to quickly precipitate a oxide or hydroxide containing Al, Si or both Al and Si, and a oxide or hydroxide containing at least one selected from the group consisting of Zn, Ni, Mg, Ca, Sr, Ba, P, Zr, Ti, Hf, Mo, Sn, Sb, Pd and Fe;

filtering out said acicular or plate-like magnetic particles together with said oxide or hydroxide deposited or precipitated on the surface or periphery of the acicular or plate-like magnetic particles in said suspension;

washing and drying the obtained solid substance composed of the acicular or plate-like magnetic particles and said oxide or hydroxide; and compacting and pulverizing said solid substance by an edge runner mill so as to adhere an oxide or hydroxide containing Al, Si or both Al and Si and an oxide or hydroxide containing at least one selected from the group consisting of Zn, Ni, Mg, Ca, Sr, Ba, P, Zr, Ti, Hf, Mo, Sn, Sb, Pd and Fe.

In a seventh aspect of the present invention, there are provided a process for producing magnetic particles for magnetic recording comprising the steps of:

adding an aqueous alkali solution to an aqueous suspension containing acicular or plate-like magnetic particles to obtain a suspension having a pH of not less than 10;

adding an aqueous solution containing Al, an aqueous solution containing Si or a mixture thereof to said suspension;

adjusting the pH of said suspension to approximately the neutrality under stirring to quickly precipitate an oxide or hydroxide containing Al, Si or both Al and Si;

filtering out said acicular or plate-like magnetic particles together with said oxide or hydroxide deposited or precipitated on the surface or periphery of the acicular or plate-like magnetic particles in said suspension;

washing and drying the obtained solid substance composed of the acicular or plate-like magnetic particles and said oxide or hydroxide;

compacting and pulverizing said solid substance by an edge runner mill so as to adhere an oxide or hydroxide containing Al, Si or both Al and Si to the surfaces of said acicular or plate-like magnetic particles;

adding an aqueous alkali solution to an aqueous suspension containing the obtained magnetic particles for magnetic recording which comprise acicular or plate-like magnetic particles and not less than 0.01 wt % (calculated as Al, $SiO_2$ or Al and $SiO_2$ based on the acicular or plate-like magnetic particles) of an oxide or hydroxide containing Al, Si or both Al and Si and adhered to the surfaces of the acicular or plate-like magnetic particles, and having not less than 0.50 of a molecular-weight-dependent parameter α, to obtain a suspension having a pH of not less than 10;

adding an aqueous solution containing at least one selected from the group consisting of Zn, Ni, Mg, Ca, Sr, Ba, P, Zr, Ti, Hf, Mo, Sn, Sb, Pd and Fe to said suspension;

adjusting the pH of said suspension to approximately the neutrality under stirring to quickly precipitate a oxide or hydroxide containing at least one selected from the group consisting of Zn, Ni, Mg, Ca, Sr, Ba, P, Zr, Ti, Hf, Mo, Sn, Sb, Pd and Fe;

filtering out said acicular or plate-like magnetic particles together with said oxide or hydroxide deposited or precipitated on the surface or periphery of the acicular or plate-like magnetic particles in said suspension;

washing and drying the obtained solid substance composed of the acicular or plate-like magnetic particles and said oxide or hydroxide; and compacting and pulverizing said solid substance by an edge runner mill so as to adhere an oxide or hydroxide containing at least one selected from the group consisting of Zn, Ni, Mg, Ca, St, Ba, P, Zr, Ti, Hf, Mo, Sn, Sb, Pd and Fe.

DETAILED DESCRIPTION OF THE INVENTION

As examples of magnetic particles as a raw material used in the present invention are exemplified acicular magnetic iron oxide particles such as acicular maghemite particles, acicular magnetite particles, acicular berthollide compound particles which are an intermediate oxide between maghemite particles and magnetite particles; acicular particles in which a metal such as Co, etc. other than Fe is contained the above-mentioned acicular magnetic iron oxide particles; acicular particles in which Co is coated on the surface of the above-mentioned acicular magnetic iron oxide particles; acicular magnetic metal particles containing iron as the main ingredient; and fine hexagonal ferrite particles such as fine plate-like Ba ferrite particles, fine plate-like Sr ferrite particles and fine plate-like Ba—Sr ferrite particles.

The hexagonal ferrite particles having an average particle diameter (average face size) of 0.01 to 1 μm, preferably 0.01 to 0.3, more preferably 0.05 to 0.2 μm and a plate ratio (average particle diameter/lamellar thickness) of 2 to 20, preferably 3 to 10, more preferably 3 to 7, and the acicular magnetic iron oxide particles having an average major axial diameter of 0.05 to 0.35 μm, preferably 0.1 to 0.25 μm and an aspect ratio (average major axial diameter/average minor axial diameter) of 3 to 20, preferably 5 to 10 are preferred as a raw material.

In the present invention, after the pH of an aqueous suspension containing magnetic particles is adjusted to not less than 10 by adding an aqueous alkali solution thereto, an aqueous solution of an Al compound, an aqueous solution of an Si compound or a mixture thereof to the resultant suspension. This is because it is possible to uniformly mix the above-described compound added with the magnetic particles by dispersing the magnetic particles in the suspension without precipitating the compound as a hydroxide.

As the aqueous alkali solution for adjusting the pH of the suspension to not less than 10, aqueous solutions of sodium hydroxide, potassium hydroxide, ammonia and the like are usable.

As the aqueous solution containing Al, an aqueous solution of an alkali aluminate such as sodium aluminate and potassium aluminate, and an aqueous solution of an aluminum salt such as aluminum sulfate, aluminum chloride and aluminum nitrate are usable.

The amount of Al compound added is not less than 0.01 wt %, preferably 0.01 to 5.0 wt % (calculated as Al) based on the magnetic particles as a raw material. If the amount is less than 0.01 wt %, the advantages aimed at in the present invention are not obtained. Although the advantages aimed at in the present invention are obtained even if the amount exceeds 5.0 wt %, the increment of the amount of oxide or hydroxide containing Al, which does not contribute to the magnetism, sometimes lowers the saturation magnetization. With due consideration for the dispersibility and the saturation magnetization of the magnetic particles, the amount of Al compound added is more preferably 0.05 to 3.0 wt %.

As the aqueous solution containing Si, aqueous solutions of sodium silicate, potassium silicate, colloidal silica, water glass No. 3 and the like are usable.

The amount of Si compound added is not less than 0.01 wt %, preferably 0.01 to 5.0 wt % (calculated as $SiO_2$) based on the magnetic particles as a raw material. If the amount is less than 0.01 wt %, the advantages aimed at in the present invention are not obtained. Although the advantages aimed at in the present invention are obtained even if the amount exceeds 5.0 wt %, the increment of the amount of oxide or hydroxide containing Si which does not contribute to the magnetism, sometimes lowers the saturation magnetization. With due consideration for the dispersibility and the saturation magnetization of the magnetic particles, the amount of Si compound added is more preferably 0.1 to 2.0 wt %.

When a mixture of an aqueous solution containing Al and an aqueous solution containing Si is added to the suspension in the present invention, the amount of Al and/or Si in the mixed solution added is not less than 0.01 wt %, preferably 0.01 to 5.0 wt %, more preferably 0.1 to 3.0 wt % (calculated as the total amount of Al and $SiO_2$) based on the magnetic particles as a raw material.

If the process of adhering an oxide or hydroxide containing Al, Si or Al and Si to the surfaces of the material magnetic particles is repeated not less than twice, that is, the steps taken from the step of adding an aqueous alkali solution to an aqueous suspension containing acicular or plate-like magnetic particles to obtain a suspension having a pH of not less than 10 to the step of the compaction and pulverization by an edge runner mill are repeated at least twice, preferably two to five times, the amount of Al compound added each time is 0.01 to 5.0 wt %, preferably 0.05 to 3.0 wt % (calculated as Al) based on the magnetic particles as a raw material, the amount of Si compound added each time is 0.01 wt % to 5.0 wt %, preferably 0.1 to 2.0 wt % (calculated as $SiO_2$) based on the magnetic particles as a raw material, and the amount of Al compound and Si compound added each time is not less than 0.01 to 5.0 wt %, preferably 0.05 to 3.0 wt % (calculated as the total amount of Al and $SiO_2$) based on the magnetic particles as a raw material. In this case, the total amount of Al compound and Si compound added in the whole process is 0.01 to 10.0 wt %, preferably 0.05 to 5.0 wt % (calculated as the total amount of Al and $SiO_2$) based on the magnetic particles as a raw material.

In the present invention, it is possible to add an aqueous solution at least one compound selected from the group consisting of Zn, Ni, Mg, Ca, Sr, Ba, P, Zr, Ti, Hf, Mo, Sn, Sb, Pd and Fe. As such a compound, a water-soluble salt of each element such as a sulfate, a chloride, a nitrate and an acetate thereof is usable.

The amount of such compound is 0.01 to 5.0 wt % (calculated as each element) based on the magnetic particles.

If the amount is less than 0.01 wt %, it is difficult to obtain the advantages aimed at in the present invention. Although the advantages aimed at in the present invention are obtained even if the amount exceeds 5.0 wt % the increment in the amount of oxide or hydroxide, which does not contribute to the magnetism, sometimes lowers the saturation magnetization. With due consideration for the dispersibility and the saturation magnetization of the magnetic particles, the amount of such compound added is preferably 0.05 to 3.0 wt %.

It is, in order to adequately and uniformly mix the compound in the suspension of the magnetic particles having a pH of not less than 10, that the above-described compound is added in the form of an aqueous solution. It is also possible to adequately dissolve and mix each compound in and with the suspension by adding in the form of a crystal salt.

In the present invention, an aqueous solution of the above-described compound is added to the suspension of the magnetic particles having a pH of not less than 10, and the pH of the suspension is rapidly adjusted to approximately the neutrality (pH of 6.5 to 8.5) under stirring so as to quickly precipitate substantially the total amount of Al, Si, Zn, Ni, Mg, Ca, St, Ba, P, Zr, Ti, Hf, Mo, Sn, Sb, Pd or Fe as an oxide or hydroxide thereof and produce a substance composed of the magnetic particles and the oxide or hydroxide thereof.

The time for adjusting the pH of the suspension and for precipitating an oxide or hydroxide containing each element in the suspension is in the range of not more than 10 minutes, preferably 1 to 10 minutes, more preferably 1 to 9 minutes, still more preferably 1 to 8 minutes. If the time exceeds 10 minutes, the oxide or hydroxide containing each element is sometimes precipitated on the surfaces of the magnetic particles in layers.

After the precipitation of the oxide or hydroxide thereof, the thus-obtained solid substance composed of the magnetic particles as a raw material and the oxide or hydroxide thereof is filtered out under the normal conditions by an ordinary method.

As the acid for adjusting the pH of the suspension, sulfuric acid, hydrochloric acid, acetic acid, nitric acid, carbon dioxide gas, etc. are usable.

Among the above-described elements, Ca, Sr and Ba sometimes elute when substantially the total amount of precipitated oxide or hydroxides thereof are washed. To prevent this, they are preferably subjected to the following treatments. When a Ca compound is used and the suspension containing the Ca compound is neutralized with the above-described acid other than carbon dioxide gas, after the pH of the suspension is adjusted, a slight amount of carbon dioxide gas is further blown into the suspension so as to bubble it. By this treatment, Ca ions are combined with carbon dioxide gas as $CaCO_3$, so that Ca is unlikely to elute. The same treatment may be adopted when an Sr compound is used so that Sr ions are combined with carbon dioxide gas as $SrCO_3$ and Sr is unlikely to elute. When a Ba compound is used, the suspension containing the Ba compound is preferably neutralized with sulfuric acid. When an acid other than sulfuric acid is used as the neutralizer, it is preferable to add sulfuric acid after the adjustment of the pH so as to combine Ba ions therewith as $BASO_4$, whereby Ba ions are unlikely to elute.

The thus-obtained solid substance composed of the magnetic particles and the oxide or hydroxide is washed and dried by an ordinary method.

As the edge runner mill used for the compaction and pulverization of the solid obtained substance in the present invention, "Sand Mill" manufactured by Kabushiki Kaisha Matsumoto Chuzo Tekkosho and "Mix Muller" manufactured by Shinto Industry Co., Ltd., etc. are usable.

The line load of the edge runner mill is 15 to 80 kg/cm, preferably 30 to 60 kg/cm. If the line load is less than 15 kg/cm, since the shearing force during grinding is too weak, it is impossible to exert the mechanochemical effect. On the other hand, if the line load exceeds 80 kg/cm, there is a fear of the particles themselves being broken. The treating time is 15 to 120 minutes, preferably 30 to 60 minutes.

In the present invention, the steps taken from the step of adding an aqueous alkali solution to an aqueous suspension containing acicular or plate-like magnetic particles to obtain a suspension having a pH of not less than 10 to the step of the compaction and pulverization of the solid substance composed of the magnetic particles and the oxide or hydroxide by an edge runner mill may be repeated not less than twice, preferably two to five times. Although the advantages aimed at in the present invention are obtained even if they are repeated more than five times, the advantages are approximately fully achieved the repeating treatment of not less than 6 times is not industrial.

The magnetic particles of the present invention produced by the above-described method are set forth below.

(1) Magnetic particles for magnetic recording which comprise acicular or plate-like magnetic particles and not less than 0.01 wt % (calculated as Al, $SiO_2$ or Al and $SiO_2$ based on the acicular or plate-like magnetic particles), preferably 0.01 to 10 wt %, more preferably 0.05 to 5.0 wt %, still more preferably 0.1 to 3.0 wt % of an oxide or hydroxide containing Al, Si or both Al and Si and adhered to the surfaces of the acicular or plate-like magnetic particles, and which have not less than 0.5, preferably not less than 0.53, more preferably not less than 0.55 of a molecular-weight-dependent parameter α represented by the following formula (I):

$$As = K_1 \cdot M^\alpha \qquad (I)$$

wherein M represents a number-average molecular weight of a binder, As represents a saturation adsorption amount of the binder, and $K_1$ represents a constant dependent on the binder and a solvent used for measuring As.

(2) Magnetic particles for magnetic recording which comprise acicular or plate-like magnetic particles and not less than 0.01 wt % (calculated as Al, $SiO_2$ or Al and $SiO_2$ based on the acicular or plate-like magnetic particles), preferably 0.01 to 10 wt %, more preferably 0.05 to 5.0 wt %, still more preferably 0.1 to 3.0 wt % of an oxide or hydroxide containing Al, Si or both Al and Si and adhered to the surfaces of the acicular or plate-like magnetic particles, and further not less than 0.01 wt % (calculated as Zn, Ni, Mg, Ca, Sr, Ba and P based on the acicular or plate-like magnetic particles), preferably 0.01 to 5.0 wt %, more preferably 0.05 to 3.0 wt % of an oxide or hydroxide containing at least one selected from the group consisting of Zn, Ni, Mg, Ca, Sr, Ba and P and adhered to the surfaces of the thus-obtained magnetic particles, and which have less than 2 wt % (calculated as C) of a residual solvent and not less than 0.5, preferably not less than 0.53, more preferably not less than 0.55 of a molecular-weight-dependent parameter α represented by the formula (I).

(3) Magnetic particles for magnetic recording which comprise acicular or plate-like magnetic particles and not less than 0.01 wt % (calculated as Al, $SiO_2$ or Al and $SiO_2$ based on the acicular or plate-like magnetic particles), preferably 0.01 to 10 wt %, more preferably 0.05 to 5.0 wt %, still more preferably 0.1 to 3.0 wt % of an oxide or hydroxide containing Al, Si or both Al and Si and adhered to the surfaces of acicular or plate-like magnetic particles and further not less than 0.01 wt % (calculated as Zr, Ti, Hf and Mo based on the acicular or plate-like magnetic particles), preferably 0.01 to 5.0 wt %, more preferably 0.05 to 3.0 wt % of an oxide or hydroxide containing at least one selected from the group consisting of Zr, Ti, Hf and Mo and adhered to the surfaces of the thus-obtained magnetic particles, and which have not less than 0.5, preferably not less than 0.53, more preferably not less than 0.55 of a molecular-weight-dependent parameter α represented by the formula (I).

(4) Magnetic particles for magnetic recording which comprise acicular or plate-like magnetic particles and not less than 0.01 wt % (calculated as Al, $SiO_2$ or Al and $SiO_2$ based on the acicular or plate-like magnetic particles), preferably 0.01 to 10 wt %, more preferably 0.05 to 5.0 wt %, still more preferably 0.1 to 3.0 wt % of an oxide or hydroxide containing Al, Si or both Al and Si and adhered to the surfaces of acicular or plate-like magnetic particles and further not less than 0.01 wt % (calculated as Sn, Sb, Pd and Fe based on the acicular or plate-like magnetic particles), preferably 0.01 to 5.0 wt %, more preferably 0.1 to 3.0 wt % of an oxide or hydroxide containing at least one selected from the group consisting of Sn, Sb, Pd and Fe and adhered to the surfaces of the thus-obtained magnetic particles, and which have not less than 0.5, preferably not less than 0.53, more preferably not less than 0.55 of a molecular-weight-dependent parameter α represented by the formula (I).

The "hydroxide" used in the present invention means hydrated hydroxide, hydrated oxide, and an intermediate of the hydrated hydroxide and the hydrated oxide, such as hydrated oxyhydroxide and the like.

In the present invention, magnetic particles having about 0.50 to 0.80 of the parameter α, produced from hexagonal ferrite particles; magnetic particles having about 0.50 to 0.80 of the parameter α, produced from Co-coated magnetic iron oxide particles; and magnetic particles having about 0.50 to 0.80 of the parameter α, produced from magnetic iron oxide particles such as maghemite particles, magnetite particles, or berthollide compound particles which are an intermediate oxide between maghemite particles and magnetite particles are obtained.

The parameter α of the magnetic particles coated with an Si compound and/or an Al compound by the method described in, for example, Japanese Patent Application Laid-Open (KOKAI) No. 55-83207 (1980), 57-56904 (1982), 58-161725 (1983), 59-23505 (1984), 60-217529 (1985), 61-63921 (1986), 62-89226 (1987) and 63-161522 (1988) is as low as about 0.40 to 0.45. It has been considered by the present inventors that this is because the surfaces of magnetic iron oxide particles are uniformly coated with a oxide or hydroxide containing Al and/or Si which is precipitated in a comparatively long time, so that when these particles are dispersed in a polymer, the number of polymer adsorption sites on the surfaces of the magnetic particles is small.

The parameter α of the magnetic particles coated with an Si compound and an Al compound, or a compound containing at least one selected from the group consisting of Cu, Ag, Ti, Zr, Sn, V, Nb, Ta, Sb, Cr, W, Ni and Mo by the method described in, for example, Japanese Patent Application Laid-Open (KOKAI) No. 58-60506 (1983), 59-103310 (1984), 63-303817 (1988) and 2-280301 (1990) is as low as about 0.40 to 0.45. It has been considered by the present inventors that this is because the surfaces of magnetic iron oxide particles are uniformly coated with a hydroxide containing at least one selected from the group consisting of Cu, Ag, Ti, Zr, Sn, V, Nb, Ta, Sb, Cr, W, Ni and Mo which is precipitated in a comparatively long time, so that when these particles are dispersed in a polymer, the number of polymer adsorption sites on the surfaces of the magnetic particles is small.

For this reason, a method of increasing the polymer adsorption sites on the surfaces of magnetic particles as much as possible so as to increase the thickness of the polymer adsorption layer was investigated.

It has been considered by the present inventors that it was necessary to chemically and firmly adsorb the ultrafine particles of an oxide or hydroxide containing Al, Si or both Al and Si and/or a compound of at least one selected from the group consisting of Zn, Ni, Mg, Ca, Sr, Ba, P, Zr, Ti, Hf, Mo, Sn, Sb, Pd and Fe to the surfaces of the magnetic particles as much as possible.

When the ultrafine particles of (i) an oxide or hydroxide containing Al, Si or both Al and Si, (ii) an oxide or hydroxide containing Al and/or Si and an oxide or hydroxide containing at least one selected from the group consisting of Zn, Ni, Mg, Ca, St, Ba and P, (iii) an oxide or hydroxide containing Al and/or Si and an oxide or hydroxide containing at least one selected from the group consisting of Zr, Ti, Hf and Mo, or (iv) an oxide or hydroxide containing Al and/or Si and an oxide or hydroxide containing at least one selected from the group consisting of Sn, Sb, Pd and Fe were uniformly deposited and/or precipitated in a suspension containing magnetic particles, uniformly mixed with the magnetic particles and the obtained solid substance was compacted and pulverized, the ultrafine particles composed of (i) an oxide or hydroxide containing Al, Si or both Al and Si, (ii) an oxide or hydroxide containing Al and/or Si and an oxide or hydroxide containing at least one selected from the group consisting of Zn, Ni, Mg, Ca, Sr, Ba and P, (iii) an oxide or hydroxide containing Al and/or Si and an oxide or hydroxide containing at least one selected from the group consisting of Zr, Ti, Hf and Mo, or (iv) an oxide or hydroxide containing Al and/or Si and an oxide or hydroxide containing at least one selected from the group consisting of Sn, Sb, Pd and Fe were respectively adhered to the surfaces of the magnetic particles due to the mechanochemical effect, so that the parameter $\alpha$ of the magnetic particles was as large as not less than 0.50. This is considered to be because the number of polymer adsorption sites on the surfaces of the magnetic particles was increased.

This effect was further improved by repeating the steps of the precipitation of the oxide or hydroxide (i), (ii), (iii) or (iv), and the compaction and pulverization of the solid substance composed of the oxide or hydroxide and the magnetic particles as a raw material at least twice. This is considered to be because the repetition makes the adherence of the ultrafine particles of the oxide or hydroxide to the surfaces of the magnetic particles more firmly and more securely, and increases the number of polymer adsorption sites on the surfaces of the magnetic particles, so that a larger parameter $\alpha$ is obtained.

The magnetic recording medium according to the present invention is obtained by applying a coating composition containing a binder resin and the magnetic particles of the present invention to a substrate by a conventional method to form a magnetic recording layer on the substrate. The amount of magnetic particles in the magnetic recording layer is 60 to 90 wt %, preferably 65 to 85 wt %. The amount of binder in the magnetic recording layer is 10 to 40 wt %, preferably 15 to 35 wt % and the amount of additives therein is not more than 30 wt %.

The coating composition may contain additives which are usually used, such as lubricants, abrasives and antistatic agent.

As the binder resin in the present invention, the resins which are ordinarily used in the production of a magnetic recording medium are used, for example, vinyl chloride-vinyl acetate copolymer, polyurethane, vinyl chloride-vinyl acetate-maleic acid urethane elastomer, butadieneacrylonitrile copolymer, polyvinyl butyral, cellulose derivatives such as nitrocellulose, polyester, synthetic rubber resins such as polybutadiene, epoxy resins and acrylic urethane resins, and mixtures thereof.

As the substrate, the materials which are ordinarily used in the production of a magnetic recording medium are usable, for example, the films of synthetic resins such as polyethylene terephthalate, polyethylenes, polyproplylenes, plycarbonates, polyethylene naphthalates, polyamides, polyamide-imides, polyimides and polysulfones, the foils or the plates of metals such as aluminum and stainless steel, and various kinds of paper.

The thickness of the magnetic recording layer of the present invention is 0.1 to 20 μm, preferably 0.1 to 7 μm.

When a magnetic recording medium is produced by coating a non-magnetic substrate with a coating composition composed of the magnetic particles obtained by adhering the ultrafine particles of an oxide or hydroxide containing Al, Si or both Al and Si and an oxide or hydroxide containing at least one selected from the group consisting of Zn, Ni, Mg, Ca, St, Ba and P and a binder resin, and drying the coated material, not only are the magnetic particles highly affinity for the binder resin and the dispersibility thereof is improved, but also the surface activity of the magnetic particles is improved in the coating film formed by applying the coating composition to the substrate and curing the applied composition, so that the amount of solvent modified on the surfaces of the magnetic particles is so small and, hence, the amount of solvent remaining on the surfaces of the magnetic particles or in the coating film after the coating film is dried is so small that the coating film is unlikely to be plasticized, whereby the strength and the durability of the magnetic recording medium are improved.

However, it has been found from many experiments made by the present inventors over a long time that while the amount of residual solvent in the magnetic particles in the present invention produced by adhering the ultrafine particles of an oxide or hydroxide containing Al and/or Si and an oxide or hydroxide containing at least one selected from the compounds of Sn, Ni, Mg, Ca, St, Ba, and P is as small as less than 2.0% calculated as C, the amount of residual solvent of magnetic particles without any addition of the above-described compound is not less than 2.0%.

When a magnetic recording medium is produced by coating a non-magnetic substrate with a coating composition composed of the magnetic particles obtained by adhering the ultrafine particles of an oxide or hydroxide containing Al, Si or both Al and Si and an oxide or hydroxide containing at least one selected from the group consisting of Zr, Ti, Hf and Mo and a binder resin, and drying the coated material, the magnetic particles are not only highly affinity for the binder resin and the dispersibility thereof is improved, but also capable of enhancing the mechanical strength (scratch resistance) of the coating film and reducing the friction coefficient thereof. As a result, the magnetic recording medium are excellent in a running durability.

This means that it is possible to produce a highly practical magnetic recording medium from the magnetic particles of the present invention. This is a result of the attempt of the present inventors to improve the durability of a magnetic tape while reducing the amount of abrasives and lubricants used by modifying the surfaces of the magnetic particles, as described above. The relationship between magnetic particles and the durability of the magnetic tape produced therefrom has been investigated, and found that the properties of the surfaces of the magnetic particles greatly influence the durability of the magnetic tape produced therefrom.

Since the properties of the surfaces of the magnetic particles exposed in the surface of the outermost layer of a magnetic tape influence the scratch resistance and the wear characteristics of the magnetic tape, it is considered that the existence of an oxide or hydroxide containing Al, Si or both Al and Si and an oxide or hydroxide containing at least one selected from the group consisting of Zr, Ti, Hf and Mo on the surfaces of the magnetic particles of the present invention improves the scratch resistance of the magnetic tape with respect to a magnetic head, and such an oxide or hydroxide also functions as a solid lubricant, which lowers the friction coefficient of the magnetic tape, so that the excellent running durability is obtained.

When a magnetic recording medium is produced by coating a non-magnetic substrate with a coating composition composed of the magnetic particles obtained by adhering the ultrafine particles of an oxide or hydroxide containing Al, Si or both Al and Si and an oxide or hydroxide containing at least one selected from the group consisting of Sn, Sb, Pd and Fe and a binder resin, and drying the coated material, the magnetic particles are not only highly affinity for the binder resin and the dispersibility thereof is improved, but also capable of lowering the surface resistance without impairing the saturation magnetization and the residual magnetization.

This is a result of the attempt of the present inventors to reduce the surface resistance of a magnetic tape without impairing the saturation magnetization and the residual magnetization, while reducing the amount of carbon black or another antistatic agent used by modifying the surfaces of the magnetic particles, as described above. The relationship between magnetic particles and the surface resistance of the magnetic tape produced therefrom has been investigated and it has been found that the surfaces of the magnetic particles greatly influence the surface resistance of the magnetic tape produced therefrom.

Since the properties of the surfaces of the magnetic particles exposed in the surface of the outermost layer of a magnetic tape influence the surface resistance and the charging property of the magnetic tape, it is considered that the existence of an oxide or hydroxide containing Al, Si or both Al and Si and an oxide or hydroxide containing at least one selected from the group consisting of Sn, Sb, Pd and Fe on the surfaces of the magnetic particles of the present invention reduces the surface resistance of the magnetic tape to not more than $5 \times 10^9$ Ω/sq. and improves the charging property of the magnetic tape and the sliding portions of a recording machine.

The solid substance composed of the magnetic particles as a raw material and the oxide or hydroxide exist by the interaction thereof, so that the filtration, washing, and drying of the solid substance are carried out by an ordinary method without particularly deteriorating the operability.

However, the effect of the present invention is not attained by a method of adding a dispersant to a slurry of magnetic iron oxide particles and mechanically shearing the particles, as shown in Japanese Patent Application Laid-Open (KOKAI) No. 55-157216 (1980) or by a method of adding a silane coupling agent to magnetic particles and mixing in a dry process, as shown in Japanese Patent Application Laid-Open (KOKAI) No. 2-188429 (1990).

The magnetic recording medium of the present invention has a surface gross of 150 to 200%, preferably 152 to 200%; a surface roughness of 3 to 9.2 nm, preferably 3 to 9.0 nm; Young's modulus (relative value) of 95 to 130, preferably 100 to 130 (in plate-like particles); Young's modulus (relative value) of 125 to 150, preferably 130 to 150 (in acicular particles); a friction coefficient of 0.20 to 0.35, preferably 0.20 to 0.30 (in plate-like particles); a friction coefficient of 0.15 to 0.25 (in acicular particles); a running durability of 14 to 60 minutes, preferably 16 to 60 minutes; a surface resistance of $2 \times 10^8$ to $5 \times 10^9$ Ω/sq; and an amount of residual solvent of 0.1 to 1.8 wt %, preferably 0.1 to 1.6 wt %.

The magnetic particles of the present invention are excellent in dispersibility, so that they are suitable as magnetic particles for high-density recording.

When a magnetic recording medium is produced from the magnetic particles of the present invention, since the surface activity of magnetic particles is improved, the amount of solvent remaining in the magnetic particles contained in the coating film after the coating film is dried is small, thereby improving the strength and the durability of the magnetic recording medium.

In addition, since the mechanical strength (scratch resistance) is improved and the friction coefficient is reduced, the running durability of the magnetic recording medium is excellent.

Furthermore, since the magnetic particles are highly affinity for the binder resin and the dispersibility thereof is excellent, the surface smoothness of the magnetic recording medium is excellent. Since it is possible to reduce the surface resistance of the magnetic recording medium, the charging property is so excellent so as to reduce the number of dropouts and suppress the sticking of the magnetic recording medium to a recording machine. In this way, the magnetic recording medium is excellent.

EXAMPLES

The present invention will now be described in more detail with reference to the following examples, but the present invention is not restricted to those examples and various modifications are possible within the scope of the invention.

The properties in the examples were measured by the following methods.

(1) Dispersibility

The dispersibility was evaluated by the molecular-weight-dependent parameter α in the formula (I):

$$As = K_1 \cdot M^\alpha \qquad (I)$$

The closer the parameter α to 1, the more excellent the dispersibility. In the present invention, it is necessary that $\alpha \geq 0.5$.

Binder solutions of not less than three kinds, preferably 5 to 6 kinds having different resin concentrations within the range of 0.01 to 5% were obtained by adding and dissolving resin binders having different molecular weight, that is, (i) an urethane resin having a number-average molecular weight of 15,000, (ii) an urethane resin having a number-average molecular weight of 28,000 and (iii) an urethane resin having a number-average molecular weight of 42,000 into a mixed solvent of methyl ethyl ketone, tolene and cyclohexane (weight ratio: 5:3:2), respectively.

A resin concentration of each binder solution prepared was measured by a weight method and was assumed to be an initial resin concentration Ci.

To 56 g of each binder resin prepared, 20 g of magnetic particles were added and resultant solution was uniformly dispersed to form a magnetic coating composition until an adsorbed resin concentration on the surface of the magnetic particles and a resin concentration in the binder solution were attained to equilibrium. The obtained magnetic coating composition was subjected to centrifugal separation a% a rate of 10,000 rpm for 25 minutes by using a centrifugal separator (manufactured by Kokusan Enshinki Kabushiki Kaisha). After attaining equilibrium state between a supernatant liquid and a precipitated substance, the precipitated substance was removed therefrom and an equilibrated binder concentration C of the obtained supernatant liquid was determined by a weight method.

The difference obtained by subtracting the binder concentration C of the supernatant liquid from the initial resin concentration Ci is assumed to be an apparent resin-adsorption amount A of the magnetic particles.

The binder concentration C and the apparent resin-adsorption amount A of the each binder solution having different concentration were measured by the same method described above.

The obtained values were plotted in a graph of an ordinate of the ratio (C/A) of the binder concentration C to the apparent resin adsorption amount A and an abscissa of the binder concentration C, thereby obtaining a linear relationship therebetween.

The inclination of the obtained straight-line in the graph corresponds to 1/As in the following Langmuir induction formula.

$$C/A = (1/As) \times C + (1/As \cdot K_2)$$

C: Equilibrated binder concentration of the supernatant liquid

A: Apparent resin-adsorption amount

As: Saturation adsorption amount $K_2$: Constant

Accordingly, the saturation adsorption amount As was obtained from the above-mentioned Langmuir induction formula.

The saturation adsorption amount As and the molecular weight M of the binder were plotted in a log-log table so as to obtain the linear relationship between As and M. The molecular weight-dependent parameter $\alpha$ was obtained from the inclination of the straight line.

(2) Amount of coating element

The amount of element of the Al, Si, Zn, Ni, Mg, Ca, Sr, Ba, P, Zr, Ti, Hf, Mo, Sn, Sb, Pd or Fe compound with which the magnetic particles were coated, was measured by fluorescent X-ray analysis.

(3) Magnetic properties

The magnetic properties of the magnetic particles were measured by using "Vibration Sample Magnetometer VSM-3S-15", manufactured by Toei Kogyo Kabushiki Kaisha and applying an external magnetic field of 10 kOe (5 kOe when magnetic iron oxide particles were used). The magnetic properties of the magnetic recording medium were measured by applying an external magnetic field of 10 kOe (5 kOe when Co-coated magnetic iron oxide particles or magnetic iron oxide particles were used).

(4) Amount of residual solvent

After a sample was adequately immersed in cyclohexanone, it was dried at a temperature of 60° C. for 24 hours. The carbon content C in the sample was obtained by quantitative analysis by "Carbon/Sulfur Analyzer EMIA-2200" (manufactured by Kabushiki Kaisha Horiba Seisakysho). The smaller the content C, the smaller the amount of the residual solvent and the more preferable because the interaction between the sample and the solvent is less strong.

(5) Surface Gloss

The surface gloss of the coating film was measured by "UGV-5D" (manufactured by Suga Testing Machine Kabushiki Kaisha) at an incident angle of 45°. The value was expressed by percent on the assumption that the standard plate glossiness was 86.3%.

(6) Surface roughness

The surface roughness Ra was expressed by the center line-average roughness of the coating film measured by "Surfcom-575A" (manufactured by Tokyo Seimitsu Co., Ltd.)

(7) Strength of coating film

The strength of the coating film was expressed by the Young's modulus obtained by using "Autograph" (manufactured by Shimazu Seisakusho Ltd.) The Young's modulus was expressed by the ratio of the Young's modulus of the coating film to that of a commercially available video tape "AV T-120 (manufactured by JVC Corp.). The higher the relative value, the more favorable.

(8) Friction coefficient of coating film

The friction coefficient of the coating film was expressed by the friction coefficient between the coating surface and the base film (substrate) obtained from the relationship between the tensile stress and the load. The lower the friction coefficient, the more slipper the coating film is.

(9) Running durability

The running durability was evaluated by the operating time under the conditions that the load was 200 gw and the relative speed of the head and the tape was 16 m/s by using "Media Durability Tester MDT-3000" (manufactured by Steinberg Associates Corp.). The longer the operating time, the higher the running durability.

(10) Scratch resistance

The surface of the magnetic tape after running was observed and the degree of scratching was visually judged. Evaluation was divided into the following four ranks.

A: No scratch

B: A few scratches

C: Many scratches

D: Great many scratches

In the present invention, the evaluation is required to be A or B.

(11) Surface resistance

After the coating film was exposed to an atmosphere of 25° C. and 60% RH for not less than 12 hours, it was slit into a width of 6 mm. The test piece was placed on metal electrodes of 6.5 mm wide. A weight of 170 g was attached to both ends of the test piece so as to be brought into close contact with the electrodes. A DC voltage of 500 V was applied between the electrodes so as to measure the surface resistance of the coating film.

<Surface treatment of magnetic particles>

Examples 1 to 7

Example 1

6 kg of plate-like Co- and Ti-substituted Ba ferrite particles having an average particle diameter of 0.05 μm, a plate ratio (average particle diameter/lamellar thickness) of 5.0 and a coercive force of 736 Oe was mixed with water, and the mixture was stirred. Thereafter, an aqueous solution of NaOH of 0.1 mol/l was added to the mixture until a pH of the mixed suspension came into 11.4.

After the mixed suspension was stirred, 2220 ml (equivalent to 0.5 wt % of the magnetic particles (calculated as Al)) of an aqueous sodium aluminate of 0.5 mol/l was added to the resultant suspension, and the mixed suspension was stirred.

While stirring the mixed suspension, an aqueous solution of HCl of 0.1 mol/l was added so as to adjust the pH to 7.0. The time taken for the adjustment was 8 minutes. The precipitate was immediately filtered out, washed with water and dried by an ordinary method to obtain a solid substance.

5 kg of the thus-obtained solid substance were charged into an edge runner mill "MPUV-Model 2" (manufactured by Kabushiki Kaisha Matsumoto Chuzo Tekkosho), and compacted and pulverized for 60 minutes at a line load of 60 kg/cm.

The average particle diameter of the magnetic particles obtained was 0.05 μm, the plate ratio was 5.0, the coercive force was 736 Oe, and the parameter α was 0.59.

Examples 2 to 7

Magnetic particles were produced in the same procedure as in Example 1 except for varying the kind of magnetic particles as a raw material, the kind and the amount of compound added, the time taken to add the compound, the stirring time and the line load and the time for the compaction and pulverization.

The main producing conditions and various properties of the product in each example are shown in Tables 1 and 2.

<Production of magnetic tape>

Examples 8 to 14.

Example 8

The magnetic particles obtained in Example 1 were first mixed with a binder resin and a solvent so that the solid content was 76 wt %, and the mixture was kneaded for 30 minutes by a PLASTI-CORDER (manufactured by Brabender Corp.). Thereafter, a predetermined amount of kneaded product was taken out and charged into a glass bottle together with abrasive carbon black, glass beads and a solvent. The mixture was mixed and dispersed for 6 hours by a paint conditioner. Lubricants and a hardening agent were further added to the mixture, and the resultant mixture was mixed and dispersed for 15 minutes. The final composition of the magnetic paint obtained was as follows:

| | |
|---|---|
| Magnetic particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Abrasives | 10 parts by weight |
| Carbon black | 3 parts by weight |
| Lubricants | 2.5 parts by weight |
| Hardening agent | 5 parts by weight |
| Cyclohexanone | 52.5 parts by weight |
| Methyl ethyl ketone | 130.5 parts by weight |
| Toluene | 78.3 parts by weight |

The magnetic paint obtained was applied to a polyethylene terephthalate film having a thickness of 14 μm to a thickness of 40 μm by using an applicator, and dried to obtain a sheet-like sample.

The sheet-like sample was calendered, and hardened at 60° C. for 24 hours. The sample was then slit to a width of 0.5 inch to produce a magnetic tape.

The coercive force Hc of the magnetic tape produced was 780 Oe, the squareness was 0.83, the gloss was 186%, and the surface roughness Ra was 6.0 nm.

Examples 9 to 14

Magnetic tapes were produced in the same procedure as in Example 8 except for using the magnetic particles obtained in Examples 2 to 7. Various properties of the products are shown in Table 3.

Example 15

6 kg of plate-like Co- and Ti-substituted Ba ferrite particles having an average particle diameter of 0.05 μm, a plate ratio (average particle diameter/lamellar thickness) of 5.0 and a coercive force of 736 Oe was mixed with water and the mixture was stirred. Thereafter, an aqueous solution of NaOH of 0.1 mol/l mixture was added to the mixture until a pH of the mixed suspension came into 11.4.

After the mixed suspension was stirred, 2220 ml (equivalent to 0.5 wt % of the magnetic particles (calculated as Al)) of an aqueous sodium aluminate of 0.5 mol/l was added to the suspension and the mixed suspension was stirred.

While stirring the mixed suspension, an aqueous solution of HCl of 0.1 mol/l was added so as to adjust the pH to 7.0. The time taken for the adjustment was 8 minutes. The precipitate was immediately filtered out, washed with water and dried by an ordinary method to obtain a solid substance.

5 kg of the thus-obtained solid substance were charged into an edge runner mill "MPUV-Model 2" (manufactured by Kabushiki Kaisha Matsumoto Chuzo Tekkosho) and compacted and pulverized for 60 minutes at a line load of 60 kg/cm.

The average particle diameter of the magnetic particles obtained was 0.05 μm, the plate ratio (average particle diameter/lamellar thickness) was 5.0, the coercive force was 736 Oe, and the parameter α was 0.59.

4.5 kg of the thus-obtained magnetic particles were mixed with water again, and the mixture was stirred. Thereafter, an aqueous solution of NaOH of 0.1 mol/l was added to the mixture until a pH of a mixed suspension came into 10.8.

After the mixed suspension was stirred, 77.9 g (equivalent to 0.5 wt % of the magnetic particles (calculated as $SiO_2$)) of water glass No. 3 was added to the suspension, and the mixed suspension was stirred.

While stirring the mixed suspension, an aqueous solution of HCl of 0.1 mol/l was added so as to adjust the pH to 6.5. The time taken for the adjustment was 6 minutes. The precipitate was immediately filtered out, washed with water and dried by an ordinary method to obtain a solid substance.

4 kg of the thus-obtained solid substance were charged into an edge runner mill "MPUV-Model 2" (manufactured by Kabushiki Kaisha Matsumoto Chuzo Tekkosho), and compacted and pulverized for 60 minutes at a line load of 60 kg/cm.

The average particle diameter of the magnetic particles obtained was 0.05 μm, the plate ratio (average particle diameter/lamellar thickness) was 5.0, the coercive force was 742 Oe, and the parameter α was 0.65.

Examples 16 to 21

Magnetic particles were produced in the same procedure as in Example 15 except for varying the kind of magnetic particles as a raw material, the kind and the amount of compound added, the time taken to add the compound, the stirring time, the line load and the time for the compaction and pulverization and the number of cycles of treatments. As the material magnetic particles, the particles used in Examples 2 to 7 shown in Table 1 were used in Examples 16 to 21, respectively.

The main producing conditions and various properties of the product in each example are shown in Tables 4 to 6.

Examples 22 to 28

Magnetic tapes were produced in the same procedure as in Example 8 except for using the magnetic particles obtained in Examples 15 to 21. Various properties of the products are shown in Table 7.

Example 29

6 kg of plate-like Co- and Ti-substituted Ba ferrite particles having an average particle diameter of 0.05 μm, a plate ratio (average particle diameter/lamellar thickness) of 5.0 and a coercive force of 736 Oe was mixed with water, and the mixture was stirred. Thereafter, an aqueous solution of NaOH of 0.1 mol/l was added to the mixture until a pH of a mixed suspension came into 11.4.

After the mixed suspension was stirred, 4440 ml (equivalent to 1.0 wt % of the magnetic particles calculated as Al) of an aqueous sodium aluminate of 0.5 mol/l was added to the suspension and the mixed suspension was stirred.

While stirring the mixed suspension, an aqueous solution of HCl of 0.1 mol/l was added so as to adjust the pH to 7.5. The time taken for the adjustment was 6 minutes. The precipitate was immediately filtered out, washed with water and dried by an ordinary method to obtain a solid substance.

5 kg of the thus-obtained solid substance were charged into an edge runner mill "MPUV-Model 2" (manufactured by Kabushiki Kaisha Matsumoto Chuzo Tekkosho), and compacted and pulverized for 60 minutes at a line load of 60 kg/cm.

The average particle diameter of the magnetic particles obtained was 0.05 μm, the plate ratio (average particle diameter/lamellar thickness) was 5.0, and coercive force was 740 Oe, and the parameter α was 0.60.

After 4.5 kg of the thus-obtained magnetic particles were mixed with water again and the mixture was stirred, an aqueous solution of NaOH of 0.1 mol/liter was added to the mixture until a pH of a mixed suspension came into 11.0. Thereafter, 1380 ml (equivalent to 1.0 wt % of the magnetic particles (calculated as Zn)) of an aqueous solution of zinc sulfide of 0.5 mol/l was added to the mixture to obtain a suspension.

While stirring the suspension, an aqueous solution of HCl of 0.1 mol/l was added so as to adjust the pH to 7.5. The time taken for the adjustment was 4 minutes. The precipitate was immediately filtered out, washed with water and dried by an ordinary method to obtain a solid substance.

4 kg of the thus-obtained solid substance were charged into an edge runner mill "MPUV-Model 2" (manufactured by Kabushiki Kaisha. Matsumoto Chuzo Tekkosho), and compacted and pulverized for 60 minutes at a line load of 60 kg/cm.

The average particle diameter of the magnetic particles obtained was 0.05 μm, the plate ratio (average particle diameter/lamellar thickness) was 5.0, the coercive force was 753 Oe, the parameter α was 0.63, and the amount of residual solvent was 1.11 wt %.

Examples 30 to 36

Magnetic particles were produced in the same procedure as in Example 29 except for varying the kind of magnetic particles as a raw material, the kind and the amount of compound added, the time taken to add the compound, the stirring time, the line load and the time for the compaction and pulverization and the number of cycles of treatments.

The main producing conditions and various properties of the product in each example are shown in Tables 8 to 10.

Examples 37 to 44

Magnetic tapes were produced in the same procedure as in Example 8 except for using the magnetic particles obtained in Examples 29 to 36. Various properties of the products are shown in Table 11.

Example 45

6 kg of plate-like Co- and Ti-substituted Ba ferrite particles having an average particle diameter of 0.05 μm, a plate ratio (average particle diameter/lamellar thickness) of 5.0 and a coercive force of 736 Oe was mixed with water and the mixture was stirred. Thereafter, an aqueous solution of NaOH of 0.1 mol/l was added to the mixture until the pH of the suspension became 11.4.

After the mixed suspension was stirred, 2220 me (equivalent to 0.5 wt % of the magnetic particles (calculated as Al)) of an aqueous sodium aluminate of 0.5 mol/l was added to the suspension, and the mixed suspension was stirred.

While stirring the mixed suspension, an aqueous solution of HCl of 0.1 mol/l was added so as to adjust the pH to 7.0. The time taken for the adjustment was 5 minutes. The precipitate was immediately filtered out, washed with water and dried by an ordinary method to obtain a solid substance.

5 kg of the thus-obtained solid substance were charged into an edge runner mill "MPUV-Model 2" (manufactured by Kabushiki Kaisha Matsumoto Chuzo Tekkosho), and compacted and pulverized for 60 minutes at a line load of 30 kg/cm.

The average particle diameter of the magnetic particles obtained was 0.05 μm, the plate ratio (average particle diameter/lamellar thickness) was 5.0, the coercive force was 738 Oe, and the parameter α was 0.57.

4.5 kg of the thus-obtained magnetic particles were mixed with water again, and the mixture was stirred. Thereafter, an aqueous solution of NaOH of 0.1 mol/l was added to the mixture to adjust the pH to 10.5. 2470 ml (equivalent to 2.50 wt % of the magnetic particles (calculated as Zr)) of an aqueous solution of zirconium sulfate was then added to the mixture and stirred to obtain a mixed suspension.

While stirring the mixed suspension, an aqueous solution of HCl of 0.1 mol/l was added so as to adjust the pH to 7.0. The time taken for the adjustment was 5 minutes. The precipitate was immediately filtered out, washed with water and dried by an ordinary method to obtain a solid substance.

4 kg of the thus-obtained solid substance were charged into an edge runner mill "MPUV-Model 2" (manufactured by Kabushiki Kaisha Matsumoto Chuzo Tekkosho), and compacted and pulverized for 60 minutes at a line load of 60 kg/cm.

The average particle diameter of the magnetic particles obtained was 0.05 μm, the plate ratio (average particle diameter/lamellar thickness) was 5.0, the coercive force was 748 Oe, and the parameter α was 0.64.

Examples 46 to 52

Magnetic particles were produced in the same procedure as in Example 45 except for varying the kind of magnetic particles as a raw material, the kind and the amount of compound added, the time taken to add the compound, the stirring time, the line load and the time for the compaction and pulverization and the number of cycles of treatments. As the material magnetic particles, the particles used in Examples 29 to 36 shown in Table 8 were used in Examples 46 to 52, respectively.

The main producing conditions and various properties of the product in each example are shown in Tables 12 and 13.

Examples 53 to 60

Magnetic tapes were produced in the same procedure as in Example 8 except for using the magnetic particles obtained in Examples 45 to 52. Various properties of the products are shown in Table 14.

Example 61

6 kg of plate-like Co- and Ti-substituted Ba ferrite particles having an average particle diameter of 0.05 μm, a plate ratio (average particle diameter/lamellar thickness) of 5.0 and a coercive force of 736 Oe was mixed with water, and the mixture was stirred. Thereafter, an aqueous solution of NaOH of 0.1 mol/l was added to the mixture until the pH of the suspension became 12.0.

After the mixed suspension was stirred, 889 ml (equivalent to 0.2 wt % of the magnetic particles (calculated as Al)) of an aqueous sodium aluminate of 0.5 mol/l was added to the suspension and the mixed suspension was stirred.

While stirring the mixed suspension, an aqueous solution of HCl of 0.1 mol/l was added so as to adjust the pH to 7.5. The time taken for the adjustment was 3 minutes. The precipitate was immediately filtered out, washed with water and dried by an ordinary method to obtain a solid substance.

5 kg of the thus-obtained solid substance were charged into an edge runner mill "MPUV-Model 2" (manufactured by Kabushiki Kaisha Matsumoto Chuzo Tekkosho), and compacted and pulverized for 30 minutes at a line load of 6 0 kg/cm.

The average particle diameter of the magnetic particles obtained was 0.05 μm, the plate ratio (average particle diameter/lamellar thickness) was 5.0, the coercive force was 740 Oe, and the parameter α was 0.55.

4.5 kg of the thus-obtained magnetic particles were mixed with water again and the mixture was stirred. Thereafter, an aqueous solution of NaOH of 0.1 mol/l was added to the mixture to adjust the pH to 10.3. 1516 ml (equivalent to 2.00 wt % of the magnetic particles calculated as Sn) of an aqueous solution of sodium stannate was then added to the mixture and stirred to obtain a mixed suspension.

While stirring the mixed suspension, an aqueous solution of HCl of 0.1 mol/l was added so as to adjust the pH to 7.1. The time taken for the adjustment was 7 minutes. The precipitate was immediately filtered out, washed with water and dried by an ordinary method to obtain a solid substance.

4 kg of the thus-obtained solid substance were charged into an edge runner mill "MPUV-Model 2" (manufactured by Kabushiki Kaisha Matsumoto Chuzo Tekkosho), and compacted and pulverized for 30 minutes at a line load of 60 kg/cm.

The average particle diameter of the magnetic particles obtained was 0.05 μm, the plate ratio (average particle diameter/lamellar thickness) was 5.0, the coercive force was 746 Oe, and the parameter α was 0.60.

Examples 62 to 68

Magnetic particles were produced in the same procedure as in Example 61 except for varying the kind of magnetic particles as a raw material, the kind and the amount of compound added, the time taken to add the compound, the stirring time, the line load and the time for the compaction and pulverization and the number of cycles of treatments. As the material magnetic particles, the particles used in Examples 29 to 36 shown in Table 8 were used in Examples 62 to 68, respectively.

The main producing conditions and various properties of the product in each example are shown in Tables 15 and 17.

Examples 69 to 76

Magnetic tapes were produced in the same procedure as in Example 8 except for using the magnetic particles obtained in Examples 61 to 68. Various properties of the products are shown in Table 18.

Comparative Examples 1 to 6

Magnetic particles were produced in the same procedure as in Example 1 except for varying the kind of magnetic particles, the kind and the amount of compound added, the time taken to add the compound, the stirring time, the line load and the time for the compaction and pulverization and the number of cycles of treatments.

The main producing conditions and various properties of the product in each comparative example are shown in Tables 19 and 20.

Comparative Examples 7 to 12

Magnetic tapes were produced in the same procedure as in Example 8 except for using the magnetic particles obtained in Comparative Examples 1 to 6. Various properties of the products are shown in Table 21.

TABLE 1

| | Magnetic particles as raw material | | | |
|---|---|---|---|---|
| Examples | Kind | Average particle diameter (μm) | Plate ratio or aspect ratio (—) | Coercive force Hc (Oe) | Saturation magnetization σs (emu/g) |
| Example 1 | Plate-like Co- and Ti-containing Ba ferrite particles | 0.05 | 5.0 | 736 | 59.0 |
| Example 2 | Plate-like Co- and Ti-containing Ba ferrite particles | 0.05 | 5.4 | 825 | 59.5 |
| Example 3 | Plate-like Co- and Ti-containing Ba ferrite particles | 0.05 | 5.4 | 825 | 59.5 |
| Example 4 | Plate-like Co- and Ti-containing Ba ferrite particles | 0.07 | 5.8 | 1105 | 58.9 |
| Example 5 | Co-coated γ-$Fe_2O_3$ particles | 0.18 | 6.0 | 765 | 78.9 |
| Example 6 | Co-coated γ-$Fe_2O_3$ particles | 0.18 | 6.0 | 765 | 78.9 |
| Example 7 | γ-$Fe_2O_3$ | 0.22 | 7.0 | 362 | 73.2 |

TABLE 2

| | Production of solid substance composed of magnetic particles | | | | | | | |
|---|---|---|---|---|---|---|---|---|
| | pH before adjust- | | Calcu- lated | | pH after | Adjusting | Compaction and pulverization | |
| Examples | ment (–) | Kind | compo- nent | Amount (wt %) | adjustment (–) | time (min.) | Line load (kg/cm) | Time (min.) |
| Example 1 | 11.4 | Sodium aluminate | Al | 0.50 | 7.0 | 8 | 60 | 60 |
| Example 2 | 11.4 | Sodium aluminate | Al | 1.50 | 7.1 | 8 | 60 | 60 |
| Example 3 | 11.4 | Sodium aluminate | Al | 1.00 | 7.0 | 8 | 50 | 60 |
| | | Water glass No. 3 | $SiO_2$ | 1.00 | | | | |
| Example 4 | 11.4 | Water glass No. 3 | $SiO_2$ | 2.00 | 7.0 | 8 | 60 | 30 |
| Example 5 | 10.5 | Sodium aluminate | Al | 2.00 | 7.5 | 5 | 45 | 30 |
| Example 6 | 10.5 | Water glass No. 3 | $SiO_2$ | 1.00 | 7.5 | 5 | 45 | 30 |
| Example 7 | 11.0 | Sodium aluminate | Al | 2.00 | 7.3 | 5 | 60 | 30 |

| | Magnetic particles obtained | | | | | | |
|---|---|---|---|---|---|---|---|
| Examples | Amount of Al adhered (wt %) | Amount of $SiO_2$ adhered (wt %) | Average particle diameter (μm) | Plate ratio or Aspect ratio (–) | Coercive force Hc (Oe) | Saturation magnetization σs (emu/g) | Parameter α (–) |
| Example 1 | 0.49 | — | 0.05 | 5.0 | 736 | 58.0 | 0.59 |
| Example 2 | 1.48 | — | 0.05 | 5.4 | 820 | 58.2 | 0.61 |
| Example 3 | 1.00 | — | 0.05 | 5.4 | 825 | 57.9 | 0.65 |
| | — | 0.98 | | | | | |
| Example 4 | — | 1.89 | 0.07 | 5.8 | 1103 | 57.6 | 0.57 |
| Example 5 | 2.00 | — | 0.18 | 6.0 | 746 | 78.3 | 0.62 |
| Example 6 | — | 0.93 | 0.18 | 6.0 | 758 | 78.6 | 0.56 |
| Example 7 | 1.86 | — | 0.22 | 7.0 | 355 | 72.6 | 0.58 |

TABLE 3

| | Kind of magnetic Particles as raw material | Properties of tape | | | | |
|---|---|---|---|---|---|---|
| Examples | | Coercive force (Oe) | Residual magnetization Br (Gauss) | Squareness (–) | Glossiness (%) | Surface roughness Ra (nm) |
| Example 8 | Example 1 | 780 | 1345 | 0.83 | 186 | 6.0 |
| Example 9 | Example 2 | 888 | 1310 | 0.83 | 180 | 6.0 |
| Example 10 | Example 3 | 890 | 1286 | 0.83 | 182 | 5.6 |
| Example 11 | Example 4 | 1201 | 1250 | 0.81 | 175 | 7.6 |
| Example 12 | Example 5 | 821 | 1421 | 0.88 | 171 | 6.0 |
| Example 13 | Example 6 | 818 | 1430 | 0.87 | 163 | 8.4 |
| Example 14 | Example 7 | 401 | 1280 | 0.88 | 160 | 8.8 |

TABLE 4

| | Production of magnetic particles (First treatment) | | | | | | |
|---|---|---|---|---|---|---|---|
| | Production of solid substance composed of magnetic particles and hydroxide | | | | | Compaction and pulverization | |
| | pH before adjustment | | Amount | pH after adjustment | Adjusting time | Line load | Time |
| Examples | (–) | Kind | (wt %) | (–) | (min.) | (kg/cm) | (min.) |
| Example 15 | 11.4 | Sodium aluminate | 0.50 | 7.0 | 8 | 60 | 60 |
| Example 16 | 11.4 | Sodium aluminate | 1.50 | 7.1 | 8 | 60 | 60 |
| Example 17 | 11.4 | Sodium aluminate | 1.00 | 7.0 | 8 | 50 | 60 |
| | | Water glass No. 3 | 1.00 | | | | |
| Example 18 | 11.4 | Water glass | 2.00 | 7.0 | 8 | 60 | 30 |

TABLE 4-continued

| Examples | | | | | | | |
|---|---|---|---|---|---|---|---|
| Example 19 | 10.5 | No. 3 Sodium aluminate | 2.00 | 7.5 | 5 | 45 | 30 |
| Example 20 | 10.5 | Water glass No. 3 | 1.00 | 7.5 | 5 | 45 | 30 |
| Example 21 | 11.0 | Sodium aluminate | 2.00 | 7.3 | 5 | 60 | 30 |

| | Production of magnetic particles (First treatment) Magnetic particles obtained | | | | | | |
|---|---|---|---|---|---|---|---|
| Examples | Amount of Al adhered (wt %) | Amount of SiO$_2$ adhered (wt %) | Average particle diameter (μm) | Plate ratio or Aspect ratio (—) | Coercive force Hc (Oe) | Saturation magnetization σs (emu/g) | Parameter α (—) |
| Example 15 | 0.49 | — | 0.05 | 5.0 | 736 | 58.0 | 0.59 |
| Example 16 | 1.48 | — | 0.05 | 5.4 | 820 | 58.2 | 0.61 |
| Example 17 | 1.00 | — | 0.05 | 5.4 | 825 | 57.9 | 0.65 |
| | — | 0.98 | | | | | |
| Example 18 | — | 1.89 | 0.07 | 5.8 | 1103 | 57.6 | 0.57 |
| Example 19 | 2.00 | — | 0.18 | 6.0 | 746 | 78.3 | 0.62 |
| Example 20 | — | 0.93 | 0.18 | 6.0 | 758 | 78.6 | 0.56 |
| Example 21 | 1.86 | — | 0.22 | 7.0 | 355 | 72.6 | 0.58 |

TABLE 5

| | Production of magnetic particles (Second time) | | | | | | |
|---|---|---|---|---|---|---|---|
| | Production of solid substance composed of magnetic particles and hydroxide | | | | | Compaction and pulverization | |
| | pH before | | | pH after | Adjusting | | |
| Examples | adjustment (—) | Kind | Amount (wt %) | adjustment (—) | time (min.) | Line load (kg/cm) | Time (min.) |
| Example 15 | 10.8 | Water glass No. 3 | 1.00 | 6.5 | 6 | 60 | 60 |
| Example 16 | 10.5 | Water glass No. 3 | 0.50 | 7.0 | 5 | 45 | 60 |
| Example 17 | 11.0 | Water glass No. 3 | 1.00 | 7.5 | 5 | 60 | 30 |
| Example 18 | 11.3 | Aluminum Sulfate | 2.00 | 7.1 | 6 | 45 | 30 |
| Example 19 | 10.8 | Water glass No. 3 | 1.50 | 7.3 | 8 | 60 | 30 |
| Example 20 | 11.0 | Water glass No. 3 | 2.50 | 7.0 | 8 | 60 | 60 |
| Example 21 | 11.5 | Aluminum sulfate | 2.00 | 7.0 | 5 | 60 | 60 |

| | Production of magnetic particles (Second treatment) Magnetic particles obtained | | | | | | |
|---|---|---|---|---|---|---|---|
| Examples | Amount of Al adhered (wt %) | Amount of SiO$_2$ adhered (wt %) | Average particle diameter (μm) | Plate ratio or Aspect ratio (—) | Coercive force Hc (Oe) | Saturation magnetization σs (emu/g) | Parameter α (—) |
| Example 15 | (0.49) | 1.00 | 0.05 | 5.0 | 742 | 57.8 | 0.65 |
| Example 16 | (1.48) | 0.50 | 0.05 | 5.4 | 823 | 58.2 | 0.64 |
| Example 17 | (1.00) | 1.97* | 0.05 | 5.4 | 826 | 57.9 | 0.66 |
| Example 18 | 1.99 | (1.89) | 0.07 | 5.8 | 1120 | 57.4 | 0.62 |
| Example 19 | (2.00) | 1.50 | 0.18 | 6.0 | 740 | 78.1 | 0.67 |
| Example 20 | — | 3.41* | 0.18 | 6.0 | 746 | 78.2 | 0.60 |
| Example 21 | 3.80* | — | 0.22 | 7.0 | 349 | 72.3 | 0.63 |

Note:
*: represents the total amount of Al or SiO$_2$ adhered
(): represents the amount of Al or SiO$_2$ adhered in the precedent treatment

TABLE 6

Production of magnetic particles (Third time)

| Examples | Production of solid substance composed of magnetic particles and hydroxide | | | | | Compaction and pulverization | |
|---|---|---|---|---|---|---|---|
| | pH before adjustment (−) | Kind | Amount (wt %) | pH after adjustment (−) | Adjusting time (min.) | Line load (kg/cm) | Time (min.) |
| Example 16 | 10.9 | Sodium aluminate | 2.00 | 7.0 | 8 | 60 | 60 |
| Example 20 | 11.0 | Sodium aluminate | 1.00 | 7.3 | 5 | 60 | 60 |

Production of magnetic particles (Third treatment) Magnetic particles obtained

| Examples | Amount of Al adhered (wt %) | Amount of $SiO_2$ adhered (wt %) | Average particle diameter (μm) | Plate ratio or Aspect ratio (−) | Coercive force Hc (Oe) | Saturation magnetization σs (emu/g) | Parameter α (−) |
|---|---|---|---|---|---|---|---|
| Example 16 | 3.46* | (0.50) | 0.05 | 5.4 | 828 | 58.0 | 0.66 |
| Example 20 | 1.00 | (3.41) | 0.18 | 6.0 | 739 | 77.6 | 0.62 |

Note:
*: represents the total amount of Al or $SiO_2$ adhered
(): represents the amount of Al or $SiO_2$ adhered in the precedent treatment

TABLE 7

| | | Properties of tape | | | | |
|---|---|---|---|---|---|---|
| Examples | Magnetic Particles as raw material | Coercive force (Oe) | Residual magnetization Br (Gauss) | Squareness (−) | Glossiness (%) | Surface roughness Ra (nm) |
| Example 22 | Product in Example 15 | 786 | 1369 | 0.85 | 191 | 5.6 |
| Example 23 | Product in Example 16 | 899 | 1352 | 0.86 | 196 | 5.4 |
| Example 24 | Product in Example 17 | 896 | 1321 | 0.84 | 196 | 5.4 |
| Example 25 | Product in Example 18 | 1212 | 1296 | 0.85 | 185 | 6.8 |
| Example 26 | Product in Example 19 | 823 | 1440 | 0.89 | 176 | 5.6 |
| Example 27 | Product in Example 20 | 816 | 1462 | 0.88 | 169 | 7.0 |
| Example 28 | Product in Example 21 | 396 | 1315 | 0.88 | 165 | 7.8 |

TABLE 8

| | Magnetic particles as raw material | | | | |
|---|---|---|---|---|---|
| Examples | Kind | Average particle diameter (μm) | Plate ratio or aspect ratio (−) | Coercive force Hc (Oe) | Saturation magnetization σs (emu/g) |
| Example 29 | Plate-like Co- and Ti-containing Ba ferrite particles | 0.05 | 5.0 | 736 | 59.0 |
| Example 30 | Plate-like Co- and Ti-containing Ba ferrite particles | 0.05 | 5.4 | 825 | 59.5 |
| Example 31 | Plate-like Co- and Ti-containing Ba ferrite particles | 0.05 | 5.4 | 825 | 59.5 |
| Example 32 | Plate-like Co- and Ti-containing Ba | 0.07 | 5.8 | 1105 | 58.9 |

TABLE 8-continued

| Examples | Kind | Magnetic particles as raw material | | | |
|---|---|---|---|---|---|
| | | Average particle diameter (μm) | Plate ratio or aspect ratio (—) | Coercive force Hc (Oe) | Saturation magnetization σs (emu/g) |
| Example 33 | ferrite particles Co-coated γ-Fe$_2$O$_3$ particles | 0.18 | 6.0 | 765 | 78.9 |
| Example 34 | Co-coated γ-Fe$_2$O$_3$ particles | 0.18 | 6.0 | 765 | 78.9 |
| Example 35 | γ-Fe$_2$O$_3$ particles | 0.22 | 7.0 | 362 | 73.2 |
| Example 36 | γ-Fe$_2$O$_3$ particles | 0.22 | 7.0 | 362 | 73.2 |

TABLE 9

| | Production of magnetic particles (First treatment) | | | | | | | |
|---|---|---|---|---|---|---|---|---|
| | Production of solid substance composed of magnetic particles and hydroxide | | | | | | Compaction and Pulverization | |
| Examples | pH before adjustment (—) | Kind | Calculated as | Amount (wt %) | pH after adjustment (—) | Adjusting time (min.) | Line load (kg/cm) | Time (min.) |
| Example 29 | 11.4 | Sodium aluminate | Al | 1.00 | 7.5 | 6 | 60 | 60 |
| Example 30 | 11.4 | Water glass No. 3 Nickel sulfate | SiO$_2$ Ni | 0.50 2.00 | 7.0 | 8 | 60 | 60 |
| Example 31 | 11.4 | Sodium aluminate Water glass No. 3 | Al SiO$_2$ | 0.75 0.75 | 6.8 | 8 | 45 | 30 |
| Example 32 | 11.4 | Zinc sulfate Sodium hexametaphosphate | Zn P | 2.00 1.75 | 6.5 | 8 | 60 | 60 |
| Example 33 | 11.4 | Water glass No. 3 Barium chloride | SiO$_2$ Ba | 3.00 0.50 | 7.0 | 7 | 45 | 45 |
| Example 34 | 11.4 | Zinc sulfate Sodium hexametaphosphate | Zn P | 1.25 0.75 | 7.0 | 8 | 60 | 60 |
| Example 35 | 11.0 | Sodium aluminate | Al | 3.50 | 7.0 | 8 | 45 | 60 |
| Example 36 | 11.0 | Water glass No. 3 | SiO$_2$ | 1.00 | 7.5 | 6 | 60 | 30 |

| | Production of magnetic particles (First treatment) Magnetic particles obtained | | | | | | | |
|---|---|---|---|---|---|---|---|---|
| Examples | Calculated as | Amount of element adhered (wt %) | Average particle diameter (μm) | Plate ratio or aspect ratio (—) | Coercive force Hc (Oe) | Saturation magnetization σs (emu/g) | Parameter α (—) | Amount of residual solvent (calculated as C) (wt %) |
| Example 29 | Al | 1.00 | 0.05 | 5.0 | 740 | 57.6 | 0.60 | — |
| Example 30 | SiO$_2$ Ni | 0.48 1.98 | 0.05 | 5.4 | 825 | 57.8 | 0.58 | — |
| Example 31 | Al SiO$_2$ | 0.75 0.73 | 0.05 | 5.4 | 826 | 58.0 | 0.62 | — |
| Example 32 | Zn P | 1.99 1.71 | 0.07 | 5.8 | 1121 | 56.9 | 0.65 | — |
| Example 33 | SiO$_2$ Ba | 2.95 0.50 | 0.18 | 6.0 | 750 | 78.1 | 0.61 | 0.58 |
| Example 34 | Zn P | 1.25 0.73 | 0.18 | 6.0 | 741 | 78.3 | 0.65 | — |
| Example 35 | Al | 3.42 | 0.22 | 7.0 | 349 | 72.0 | 0.59 | — |
| Example 36 | SiO$_2$ | 0.98 | 0.22 | 7.0 | 352 | 72.6 | 0.56 | — |

TABLE 10

Production of magnetic particles (Second treatment)

| Examples | pH before adjustment (−) | Production of solid substance composed of magnetic particles and hydroxide | | | pH after adjustment (−) | Adjusting time (min.) | Compaction and Pulverization | |
|---|---|---|---|---|---|---|---|---|
| | | Kind | Calculated as | Amount (wt %) | | | Line load (kg/cm) | Time (min.) |
| Example 29 | 11.4 | Zinc sulfate | Zn | 1.50 | 7.5 | 4 | 60 | 50 |
| Example 30 | 10.8 | Aluminum sulfate | Al | 1.00 | 7.0 | 8 | 60 | 60 |
| | | Sodium hexametaphosphate | P | 0.50 | | | | |
| Example 31 | 10.5 | Magnesium chloride | Mg | 1.00 | 7.5 | 6 | 60 | 30 |
| Example 32 | 11.0 | Water glass No. 3 | $SiO_2$ | 0.75 | 7.6 | 5 | 60 | 60 |
| Example 33 | 11.5 | " | $SiO_2$ | 2.00 | 7.0 | 8 | 60 | 60 |
| Example 34 | 10.8 | Calcium chloride | Ca | 0.25 | 7.0 | 6 | 45 | 30 |
| Example 35 | 11.5 | Strontium chloride | Sr | 1.50 | 7.9 | 8 | 60 | 30 |

Production of magnetic particles (Second treatment) — Magnetic particles obtained

| Examples | Calculated as | Amount of element adhered (wt %) | Average particle diameter (μm) | Plate ratio or aspect ratio (−) | Coercive force Hc (Oe) | Saturation magnetization σs (emu/g) | Parameter α (−) | Amount of residual solvent (calculated as C) (wt %) |
|---|---|---|---|---|---|---|---|---|
| Example 29 | Zn | 1.47 | 0.05 | 5.0 | 753 | 58.0 | 0.63 | 1.11 |
| Example 30 | Al | 1.00 | 0.05 | 5.4 | 831 | 57.6 | 0.62 | 1.36 |
| | P | 0.50 | | | | | | |
| Example 31 | Mg | 0.96 | 0.05 | 5.4 | 836 | 57.6 | 0.63 | 1.46 |
| Example 32 | $SiO_2$ | 0.73 | 0.07 | 5.8 | 1130 | 56.7 | 0.66 | 0.98 |
| Example 33 | $SiO_2$ | 1.96 | 0.18 | 6.0 | 748 | 77.8 | 0.68 | 0.46 |
| Example 34 | Ca | 0.25 | 0.22 | 7.0 | 347 | 72.0 | 0.60 | 0.72 |
| Example 35 | Br | 1.46 | 0.22 | 7.0 | 348 | 71.5 | 0.60 | 0.92 |

TABLE 11

| Examples | Kind of magnetic particles | Coercive force Hc (Oe) | Residual magnetization Br (Gauss) | Squareness (−) | Glossiness (%) | Surface roughness Ra (nm) | Young's modulus (relative value) (−) |
|---|---|---|---|---|---|---|---|
| Ex. 37 | Ex. 29 | 790 | 1330 | 0.84 | 188 | 6.0 | 116 |
| Ex. 38 | Ex. 30 | 892 | 1320 | 0.85 | 190 | 5.6 | 124 |
| Ex. 39 | Ex. 31 | 899 | 1302 | 0.85 | 186 | 5.8 | 109 |
| Ex. 40 | Ex. 32 | 1195 | 1201 | 0.82 | 179 | 7.0 | 111 |
| Ex. 41 | Ex. 33 | 819 | 1446 | 0.89 | 171 | 6.0 | 132 |
| Ex. 42 | Ex. 34 | 808 | 1456 | 0.90 | 175 | 5.4 | 138 |
| Ex. 43 | Ex. 35 | 386 | 1311 | 0.87 | 156 | 8.8 | 145 |
| Ex. 44 | Ex. 36 | 872 | 1340 | 0.87 | 153 | 8.8 | 142 |

TABLE 12

Production of magnetic particles (First treatment) — Production of solid substance composed of magnetic particles and hydroxide

| Examples | pH before adjustment (−) | Kind | Calculated as | Amount (wt %) |
|---|---|---|---|---|
| Example 45 | 11.4 | Sodium aluminate | Al | 0.50 |
| Example 46 | 11.8 | Water glass No. 3 | $SiO_2$ | 0.50 |
| | | Titanyl sulfate | Ti | 1.50 |
| Example 47 | 11.8 | Sodium aluminate | Al | 0.75 |
| | | Water glass No. 3 | $SiO_2$ | 0.75 |
| Example 48 | 12.0 | Zirconium sulfate | Zr | 3.00 |
| Example 49 | 11.2 | Water glass No. 3 | $SiO_2$ | 1.00 |
| | | Zirconium sulfate | Zr | 2.00 |
| Example 50 | 11.2 | Hafnium sulfate | Hf | 4.00 |
| Example 51 | 11.4 | Sodium aluminate | Al | 2.00 |
| Example 52 | 11.4 | Water glass No. 3 | $SiO_2$ | 2.50 |

Production of magnetic particles (First treatment)

| Production of the solid substance | Compaction and | Magnetic particles obtained |
|---|---|---|
| pH after Adjusting | pulverization | Amount of element |

TABLE 12-continued

| adjust-ment (-) | time (min.) | Line load (kg/cm) | Time (min.) | Calculated as | adhered (wt %) |
|---|---|---|---|---|---|
| 7.0 | 5 | 30 | 60 | Al | 0.50 |
| 7.0 | 5 | 30 | 60 | SiO$_2$ | 0.49 |
|  |  |  |  | Ti | 1.48 |
| 6.8 | 8 | 45 | 30 | Al | 0.75 |
|  |  |  |  | SiO$_2$ | 0.73 |
| 7.2 | 6 | 60 | 60 | Zr | 2.92 |
| 7.5 | 8 | 60 | 30 | SiO$_2$ | 0.99 |
|  |  |  |  | Zr | 1.98 |
| 6.8 | 8 | 60 | 45 | Hf | 3.86 |
| 7.5 | 6 | 60 | 30 | Al | 2.00 |
| 7.5 | 6 | 75 | 60 | SiO$_2$ | 2.46 |

Production of magnetic particles (First treatment)
Magnetic particles obtained

| Average particle diameter (μm) | Plate ratio or Aspect ratio (-) | Coercive force Hc (Oe) | Saturation magnetization σs (emu/g) | Parameter α (-) |
|---|---|---|---|---|
| 0.05 | 5.0 | 738 | 57.8 | 0.57 |
| 0.05 | 5.4 | 820 | 57.9 | 0.59 |
| 0.05 | 5.4 | 826 | 58.0 | 0.62 |
| 0.07 | 5.8 | 1116 | 56.3 | 0.60 |
| 0.18 | 6.0 | 752 | 78.0 | 0.65 |
| 0.18 | 6.0 | 750 | 78.0 | 0.62 |
| 0.22 | 7.0 | 352 | 73.1 | 0.57 |
| 0.22 | 7.0 | 348 | 72.6 | 0.58 |

TABLE 13

Production of magnetic particles (Second treatment)
Production of solid substance composed of magnetic particles and hydroxide

| Examples | pH before adjustment (-) | Kind | Calculated as | Amount (wt %) |
|---|---|---|---|---|
| Example 45 | 10.5 | Zirconium sulfate | Zr | 2.50 |
| Example 46 | 10.5 | Aluminum sulfate | Al | 1.00 |
|  |  | Zirconium sulfate | Zr | 1.00 |
| Example 47 | 10.7 | Titanyl sulfate | Ti | 2.00 |
| Example 48 | 10.8 | Water glass No. 3 | SiO$_2$ | 0.20 |
| Example 50 | 11.0 | Sodium aluminate | Al | 0.75 |
| Example 51 | 11.4 | Hafnium sulfate | Hf | 3.00 |
| Example 52 | 11.0 | Molybdenum chloride | Mo | 2.50 |

Production of magnetic particles (Second treatment)

| Production of the solid substance | | Compaction and pulverization | | Magnetic particles obtained | |
|---|---|---|---|---|---|
| pH after adjust-ment (-) | Adjusting time (min.) | Line load (kg/cm) | Time (min.) | Calculated as | Amount of element adhered (wt %) |
| 7.0 | 5 | 60 | 60 | Zr | 2.46 |
| 7.2 | 6 | 60 | 60 | Al | 1.00 |
|  |  |  |  | Zr | 0.99 |
| 7.0 | 5 | 60 | 60 | Ti | 1.99 |
| 7.5 | 4 | 60 | 60 | SiO$_2$ | 0.20 |
| 7.4 | 6 | 30 | 30 | Al | 0.75 |
| 7.0 | 5 | 30 | 30 | Hf | 2.96 |
| 6.8 | 6 | 30 | 30 | Mo | 2.43 |

Production of magnetic particles (First treatment)
Magnetic particles obtained

TABLE 13-continued

| Average particle diameter (μm) | Plate ratio or Aspect ratio (-) | Coercive force Hc (Oe) | Saturation magnetization σs (emu/g) | Parameter α (-) |
|---|---|---|---|---|
| 0.05 | 5.0 | 748 | 58.1 | 0.64 |
| 0.05 | 5.4 | 83 | 57.2 | 0.63 |
| 0.05 | 5.4 | 841 | 57.3 | 0.64 |
| 0.07 | 5.8 | 1125 | 56.3 | 0.61 |
| 0.18 | 6.0 | 738 | 78.0 | 0.67 |
| 0.22 | 7.0 | 347 | 72.1 | 0.62 |
| 0.22 | 7.0 | 343 | 72.0 | 0.62 |

TABLE 14

| | | Properties of tape | | | |
|---|---|---|---|---|---|
| Examples | Kind of Particles as material | Coercive force (Oe) | Residual magneti-zation Br (Gauss) | Square-ness (-) | Glossi-ness (%) |
| Example 53 | Example 45 | 795 | 1312 | 0.83 | 185 |
| Example 54 | Example 46 | 899 | 1336 | 0.83 | 186 |
| Example 55 | Example 47 | 912 | 1306 | 0.85 | 189 |
| Example 56 | Example 48 | 1170 | 1265 | 0.84 | 180 |
| Example 57 | Example 49 | 810 | 1460 | 0.90 | 170 |
| Example 58 | Example 50 | 800 | 1482 | 0.90 | 172 |
| Example 59 | Example 51 | 391 | 1300 | 0.86 | 158 |
| Example 60 | Example 52 | 388 | 1308 | 0.87 | 156 |

| Properties of tape | | | |
|---|---|---|---|
| Surface roughness Ra (nm) | Friction coefficient (-) | Running duration time (min.) | Scratch resistance |
| 6.0 | 0.28 | 20.7 | A |
| 6.2 | 0.27 | 22.1 | A |
| 5.6 | 0.30 | 18.6 | B |
| 6.8 | 0.28 | 20.2 | A |
| 5.8 | 0.22 | 25.6 | A |
| 5.8 | 0.24 | 24.9 | A |
| 8.4 | 0.25 | 28.8 | A |
| 8.6 | 0.25 | 28.2 | A |

TABLE 15

Magnetic particles as raw material

| Examples | Kind | Average particle diameter (μm) | Plate ratio or aspect ratio (-) | Coercive force Hc (Oe) | Satura-tion magne-tization σs (emu/g) |
|---|---|---|---|---|---|
| Example 61 | Plate-like Co- and Ti-containing Ba ferrite particles | 0.05 | 5.0 | 736 | 59.0 |
| Example 62 | Plate-like Co- and Ti-containing Ba ferrite particles | 0.05 | 5.4 | 825 | 59.5 |
| Example 63 | Co-coated magnetite particles | 0.22 | 6.5 | 732 | 83.2 |
| Example 64 | Co-coated magnetite particles | 0.22 | 6.5 | 732 | 83.2 |
| Example 65 | Co-coated | 0.18 | 6.0 | 765 | 78.9 |

TABLE 15-continued

Magnetic particles as raw material

| Examples | Kind | Average particle diameter (μm) | Plate ratio or aspect ratio (—) | Coercive force Hc (Oe) | Saturation magnetization σs (emu/g) |
|---|---|---|---|---|---|
| Example 66 | Co-coated maghemite particles | 0.18 | 6.0 | 765 | 78.9 |
| Example 67 | maghemite particles | 0.22 | 7.0 | 362 | 73.2 |
| Example 68 | maghemite particles | 0.22 | 7.0 | 362 | 73.2 |

TABLE 16

Production of magnetic particles (First treatment)
Production of solid substance composed of magnetic particles and hydroxide

| Examples | pH before adjustment (—) | Kind | Calcuted as | Amount (wt %) |
|---|---|---|---|---|
| Example 61 | 12.0 | Sodium aluminate | Al | 0.20 |
| Example 62 | 11.5 | Sodium aluminate | Al | 0.10 |
|  |  | Ferrous sulfate | Fe | 2.00 |
| Example 63 | 11.0 | Alminum sulfate | Al | 0.50 |
|  |  | Water glass No. 3 | SiO₂ | 1.50 |
| Example 64 | 12.0 | Sodium stannate | Sn | 2.00 |
| Example 65 | 10.5 | Water glass No. 3 | SiO₂ | 0.50 |
|  |  | Paladium chloride | Pd | 0.05 |
| Example 66 | 10.8 | Antimony chloride | Sb | 1.00 |
| Example 67 | 11.0 | Aluminum acetate | Al | 1.00 |
| Example 68 | 10.8 | Colloidal silica | SiO₂ | 1.50 |

Production of magnetic particles (First treatment)

| Production of the solid substance | | Compaction and pulverization | | Magnetic particles obtained | |
|---|---|---|---|---|---|
| pH after adjustment (—) | Adjusting time (min.) | Line load (kg/cm) | Time (min.) | Calculated as | Amount element adhered (wt %) |
| 7.5 | 3 | 60 | 30 | Al | 0.20 |
| 6.5 | 8 | 60 | 60 | Al | 0.10 |
|  |  |  |  | Fe | 2.05 |
| 7.8 | 6 | 45 | 15 | Al | 0.50 |
|  |  |  |  | SiO₂ | 1.46 |
| 7.0 | 5 | 30 | 30 | Sn | 2.00 |
| 7.2 | 3 | 30 | 30 | SiO₂ | 0.49 |
|  |  |  |  | Pb | 0.05 |
| 7.8 | 5 | 45 | 30 | Sb | 0.92 |
| 7.0 | 5 | 60 | 30 | Al | 1.00 |
| 7.2 | 5 | 30 | 15 | SiO₂ | 1.46 |

Production of magnetic particles (First treatment)
Magnetic particles obtained

| Average particle diameter (μm) | Plate ratio or aspect ratio (—) | Coercive force Hc (Oe) | Saturation magnetization σs (emu/g) | Parameter α (—) |
|---|---|---|---|---|
| 0.05 | 5.0 | 740 | 58.5 | 0.55 |
| 0.05 | 5.4 | 810 | 57.6 | 0.57 |
| 0.22 | 6.5 | 726 | 81.9 | 0.62 |
| 0.22 | 6.5 | 730 | 82.6 | 0.59 |
| 0.18 | 6.0 | 760 | 78.5 | 0.61 |
| 0.18 | 6.0 | 754 | 78.6 | 0.59 |
| 0.22 | 7.0 | 355 | 72.9 | 0.56 |
| 0.22 | 7.0 | 355 | 73.0 | 0.56 |

TABLE 17

Production of magnetic particles (Second treatment)
Production of solid substance composed of magnetic particles and hydroxide

| Examples | pH before adjustment (—) | Kind | Calculated as | Amount (wt %) |
|---|---|---|---|---|
| Example 61 | 10.3 | Sodium stannate | Sn | 2.00 |
| Example 62 | 11.0 | Colloidal silica | SiO₂ | 0.10 |
|  |  | Sodium stannate | Sn | 0.50 |
| Example 63 | 10.5 | Ferrous sulfate | Fe | 0.50 |
| Example 64 | 10.6 | Sodium aluminate | Al | 0.75 |
| Example 66 | 10.8 | Sodium aluminate | Al | 0.50 |
| Example 67 | 11.0 | Sodium stannate | Sn | 2.00 |
| Example 68 | 11.6 | Ferrous sulfate | Fe | 1.00 |

Production of magnetic particles (Second treatment)

| Production of the solid substance | | Compaction and pulverization | | Magnetic particles obtained | |
|---|---|---|---|---|---|
| pH after adjustment (—) | Adjusting time (min.) | Line load (kg/cm) | Time (min.) | Calculated as | Amount of element adhered (wt %) |
| 7.1 | 7 | 60 | 30 | Sn | 1.96 |
| 7.0 | 8 | 60 | 60 | SiO₂ | 0.10 |
|  |  |  |  | Sn | 0.51 |
| 7.5 | 4 | 30 | 30 | Fe | 0.52 |
| 7.0 | 6 | 60 | 30 | Al | 0.75 |
| 7.5 | 5 | 30 | 15 | Al | 0.50 |
| 7.5 | 6 | 45 | 30 | Sn | 1.98 |
| 7.8 | 8 | 60 | 30 | Fe | 1.00 |

Production of magnetic particles (Second treatment)
Magnetic particles obtained

| Average particle diameter (μm) | Plate ratio or Aspect ratio (—) | Coercive force Hc (Oe) | Saturation magnetization σs (emu/g) | Parameter α (—) |
|---|---|---|---|---|
| 0.05 | 5.0 | 746 | 57.6 | 0.60 |
| 0.05 | 5.4 | 826 | 56.8 | 0.60 |
| 0.21 | 6.5 | 710 | 81.0 | 0.65 |
| 0.22 | 6.5 | 725 | 82.2 | 0.62 |
| 0.18 | 6.0 | 749 | 78.3 | 0.65 |
| 0.22 | 7.0 | 345 | 71.9 | 0.61 |
| 0.22 | 7.0 | 346 | 72.5 | 0.60 |

TABLE 18

| Examples | Kind of magnetic particles | Coercive force Hc (Oe) | Residual magnetization Br (Gauss) | Squareness (—) | Glossiness (%) | Surface roughness Ra (nm) | Surface resistance (Ω/sq.) |
|---|---|---|---|---|---|---|---|
| Ex. 69 | Ex. 61 | 801 | 1296 | 0.82 | 180 | 6.4 | $4.2 \times 10^9$ |
| Ex. 70 | Ex. 62 | 889 | 1320 | 0.83 | 181 | 6.4 | $3.0 \times 10^9$ |
| Ex. 71 | Ex. 63 | 796 | 1510 | 0.91 | 168 | 6.0 | $6.5 \times 10^8$ |
| Ex. 72 | Ex. 64 | 796 | 1492 | 0.90 | 165 | 6.2 | $2.8 \times 10^8$ |
| Ex. 73 | Ex. 65 | 825 | 1462 | 0.91 | 176 | 5.4 | $5.6 \times 10^8$ |
| Ex. 74 | Ex. 66 | 822 | 1479 | 0.91 | 170 | 5.8 | $1.0 \times 10^9$ |
| Ex. 75 | Ex. 67 | 402 | 1292 | 0.87 | 155 | 8.2 | $4.6 \times 10^9$ |
| Ex. 76 | Ex. 68 | 396 | 1310 | 0.87 | 156 | 8.2 | $4.3 \times 10^9$ |

TABLE 19

| | | Magnetic particles as material | | | |
|---|---|---|---|---|---|
| Examples | Kind | Average particle diameter (μm) | Plate ratio or aspect ratio (—) | Coercive force Hc (Oe) | Saturation magnetization σs (emu/g) |
| Comp. Example 1 | Plate-like Co- and Ti-containing Ba ferrite particles | 0.05 | 5.2 | 780 | 58.3 |
| Comp. Example 2 | Plate-like Co- and Ti-containing Ba ferrite particles | 0.05 | 5.4 | 825 | 59.5 |
| Comp. Example 3 | Co-coated maghemite particles | 0.18 | 6.0 | 765 | 78.9 |
| Comp. Example 4 | Co-coated maghemite particles | 0.18 | 6.0 | 765 | 78.9 |
| Comp. Example 5 | Co-coated maghemite particles | 0.18 | 6.0 | 765 | 78.9 |
| Comp. Example 6 | Co-coated maghemite particles | 0.18 | 6.0 | 765 | 78.9 |

TABLE 20

| | Production of magnetic particles Production of solid substance composed of magnetic particles and hydroxide | | | |
|---|---|---|---|---|
| Comparative Examples | pH before adjustment (—) | Kind | Calcuted as | Amount (wt %) |
| Comp. Example 1 | — | — | — | — |
| Comp. Example 2 | 11.4 | Sodium aluminate | Al | 1.00 |
| Comp. Example 3 | — | — | — | — |
| Comp. Example 4 | 10.5 | Sodium aluminate | Al | 1.00 |
| Comp. Example 5 | 10.5 | Sodium aluminate | Al | 1.00 |
| Comp. Example 6 | 10.5 | Sodium aluminate | Al | 0.005 |

TABLE 20-continued

| Production of the solid substance | | Compaction and pulverization | | obtained | |
|---|---|---|---|---|---|
| pH after adjustment (—) | Adjusting time (min.) | Line load (kg/cm) | Time (min.) | Calculated as | Amount of element adhered (wt %) |
| — | — | 60 | 60 | — | — |
| 7.1 | 8 | — | — | Al | 0.99 |
| — | — | 45 | 30 | — | — |
| 7.4 | 5 | — | — | Al | 1.00 |
| 7.0 | 60 | — | — | Al | 1.00 |
| 7.1 | 5 | 45 | 30 | Al | 0.005 |

| Production of magnetic particles Magnetic particles obtained | | | | | |
|---|---|---|---|---|---|
| Average particle diameter (μm) | Plate ratio or aspect ratio (—) | Coercive force Hc (Oe) | Saturation magnetization σs (emu/g) | Parameter α (—) | Amount of residual solvent (calculated as C) (wt %) |
| 0.05 | 5.2 | 780 | 58.3 | 0.28 | 3.59 |
| 0.05 | 5.4 | 820 | 58.2 | 0.42 | 2.52 |
| 0.18 | 6.0 | 755 | 78.9 | 0.30 | 2.50 |
| 0.18 | 6.0 | 756 | 77.9 | 0.44 | 2.15 |
| 0.18 | 6.0 | 756 | 77.8 | 0.38 | 2.05 |
| 0.18 | 6.0 | 755 | 78.7 | 0.36 | 2.42 |

TABLE 21

| Comparative Examples | Magnetic Particles as raw material | Coercive force Hc (Oe) | Residual magnetization Br (Gauss) | Squareness (—) | Glossiness (%) | Surface roughness Ra (—) |
|---|---|---|---|---|---|---|
| Comp. Example 7 | Comp. Example 1 | 863 | 1160 | 0.76 | 135 | 18.6 |
| Comp. Example 8 | Comp. Example 2 | 868 | 1203 | 0.78 | 148 | 12.2 |
| Comp. Example 9 | Comp. Example 3 | 793 | 1326 | 0.80 | 140 | 10.6 |
| Comp. Example 10 | Comp. Example 4 | 801 | 1298 | 0.81 | 145 | 9.4 |
| Comp. | Comp. | 812 | 1276 | 0.82 | 148 | 9.4 |

TABLE 21-continued

| | | | | | |
|---|---|---|---|---|---|
| Example 11 | Example 5 | | | | |
| Comp. Example 12 | Comp. Example 6 | 781 | 1356 | 0.82 | 141 | 9.8 |

| Properties of tape | | | | |
|---|---|---|---|---|
| Frictional coefficient (—) | Running duration time (min.) | Scratch resistance | Young's modulus (relative value) (—) | Surface resistance (Ω/sq) |
| 0.40 | 0.5 | D | 86 | $2.5 \times 10^{10}$ |
| 0.38 | 1.6 | D | 92 | $5.8 \times 10^{10}$ |
| 0.34 | 6.8 | C | 108 | $6.3 \times 10^{9}$ |
| 0.26 | 12.5 | B | 116 | $8.1 \times 10^{9}$ |
| 0.28 | 11.8 | B | 119 | $1.0 \times 10^{10}$ |
| 0.30 | 7.2 | C | 101 | $7.2 \times 10^{9}$ |

What is claimed is:

1. A magnetic medium comprising a substrate and a magnetic coating containing magnetic particles which comprise (a) magnetic particles selected from the group consisting of acicular and lamellar magnetic particles of acicular magnetic iron oxide particles, acicular magnetic iron oxide particles containing a metal other than Fe, acicular magnetic iron oxide particles coated with a Co compound, acicular magnetic metal particles containing iron, fine lamellar Ba ferrite particles, fine lamellar Sr ferrite particles, fine lamellar Ba—Sr ferrite particles and mixtures thereof, and (b) not less than 0.01 wt %, calculated as Al, SiO$_2$ or Al and SiO$_2$, based on said magnetic particles, of ultrafine particles composed of an oxide or hydroxide containing Al, Si or both Al and Si and adhered to the surfaces of said magnetic particles;

wherein said magnetic particles have not less than 0.50 of a molecular-weight-dependent parameter α represented by the formula (I):

$$As = K_1 \cdot M^\alpha \qquad (I)$$

where M represents a number-average molecular weight of a binder, As represents a saturation adsorption of the binder, and K$_1$ represents a constant dependent on the binder and a solvent used for measuring As.

2. The magnetic medium according to claim 1, wherein said magnetic particles are Co-coated acicular magnetic iron oxide particles.

3. The magnetic medium according to claim 1, wherein said coated magnetic particles additionally comprise:

(c) not less than 0.01 wt %, calculated as each element, based on the weight of said magnetic particles, of ultrafine particles composed of an oxide or hydroxide containing at least one element selected from the group consisting of Zn, Ni, Mg, Ca, Sr, Ba, P, Zr, Ti, Hf, Mo, Sn, Sb, Pd and Fe, adhered to the surfaces of said magnetic particles.

4. The magnetic medium according to claim 1, wherein said coated magnetic particles additionally comprise:

(c) not less than 0.01 wt %, calculated as each element, based on the weight of said magnetic particles, of ultrafine particles composed of an oxide or hydroxide containing at least one element selected from the group consisting of Zn, Ni, Mg, Ca, Sr, Ba, P, Zr, Ti, Hf, Mo, Sn, Sb, Pd and Fe and adhered to the outer surfaces of said magnetic particles coated with said oxide or hydroxide (b) containing Al, Si or both Al and Si.

5. The magnetic medium according to claim 1, wherein said coated magnetic particles additionally comprise:

(c) not less than 0.01 wt %, calculated as each element, based on the acicular or lamellar magnetic particles, of ultrafine particles composed of an oxide or hydroxide containing at least one element selected from the group consisting of Zn, Ni, Mg, Ca, Sr, Ba, P, Zr, Ti, Hf, Mo, Sn, Sb, Pd and Fe together with said ultrafine particles (b) composed of an oxide or hydroxide containing Al, Si or both Al and Si.

6. The magnetic medium of claim 1, wherein the molecular weight-dependent parameter α is not less than 0.53.

7. The magnetic medium of claim 3, 4 or 5 wherein said ultrafine particles (c) contain at least one selected from the group consisting of Zr, Ti, Hf and Mo.

8. The magnetic medium of claim 3, 4 or 5 wherein said ultrafine particles (c) contain at least one oxide or hydroxide selected from the group consisting of Sn, Sb, Pd and Fe.

9. Magnetic particles according to claim 3, 4 or 5 wherein said magnetic particles having the ultrafine particles (c) are composed of an oxide or hydroxide of Zn, Ni, Mg, Ca, Sr, Ba and P and said magnetic particles have a residual solvent amount property of less than 2.0 wt %, calculated as C.

10. Magnetic particles according to claim 1, wherein said magnetic particles (a) are acicular maghemite particles, acicular magnetite particles, acicular berthollide compound particles or a mixture thereof.

11. Magnetic particles according to claim 1, wherein said magnetic particles are selected from the group consisting of lamellar Ba ferrite particles, lamellar Sr ferrite particles, lamellar Ba—Sr ferrite particles and a mixture thereof.

12. The magnetic medium of claim 1, wherein said magnetic medium has a running durability of 14 to 60.

13. The magnetic medium of claim 1, wherein said magnetic medium has a surface resistance of not more than $5 \times 10^9$ Ω/sq.

* * * * *